(12) United States Patent
Murade

(10) Patent No.: US 7,502,079 B2
(45) Date of Patent: Mar. 10, 2009

(54) ELECTRO-OPTICAL DEVICE AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 498 days.

(21) Appl. No.: 11/290,589

(22) Filed: Dec. 1, 2005

(65) Prior Publication Data

US 2006/0082694 A1    Apr. 20, 2006

Related U.S. Application Data

(62) Division of application No. 10/320,371, filed on Dec. 17, 2002, now Pat. No. 7,136,117.

(30) Foreign Application Priority Data

Jan. 7, 2002    (JP) ............................. 2002-000713
Dec. 16, 2002   (JP) ............................. 2002-363864

(51) Int. Cl.
  *G02F 1/1343*    (2006.01)
  *G02F 1/136*     (2006.01)
(52) U.S. Cl. .......................................... 349/39; 349/47
(58) Field of Classification Search .................. 349/43, 349/39, 38, 113, 47
  See application file for complete search history.

(56) References Cited

U.S. PATENT DOCUMENTS 4,239,346 A * 12/1980 Lloyd .......................... 349/44

| | | | |
|---|---|---|---|
| 5,668,379 A | 9/1997 | Ono et al. |
| 5,748,276 A | 5/1998 | Uno et al. |
| 5,831,694 A | 11/1998 | Onisawa et al. |
| 6,528,822 B2 | 3/2003 | Murade |
| 6,583,830 B2 | 6/2003 | Yasukawa et al. |
| 2002/0021379 A1 | 2/2002 | Kim |

FOREIGN PATENT DOCUMENTS

| JP | A-06-120099 | 4/1994 |
|---|---|---|
| JP | 2001-33125 A | 2/2001 |
| JP | 2001-209070 | 8/2001 |
| JP | 2001-330859 | 11/2001 |
| JP | 2001-343912 A | 12/2001 |
| JP | 2001-356709 | 12/2001 |
| JP | A-2001-356709 | 12/2001 |
| WO | WO 01/81994 A1 | 11/2001 |

\* cited by examiner

*Primary Examiner*—James A Dudek
(74) *Attorney, Agent, or Firm*—Oliff & Berridge, PLC

(57) ABSTRACT

An electro-optical device of the present invention includes pixel electrodes, TFTs electrically connected to the pixel electrodes, and scanning lines and data lines connected to the TFTs on a TFT array substrate. Each scanning line has a broad width portion as a gate electrode in a portion facing a channel area of the TFT and the narrow width portion. As a result, an electro-optical device capable of easily adjusting an arrangement of the gate electrodes and the scanning lines and at the same time precisely driving the TFTs is provided.

3 Claims, 21 Drawing Sheets

(a)

(b)

ELECTRO-OPTICAL DEVICE AND ELECTRONIC APPARATUS

This is a Division of application Ser. No. 10/320,371 filed Dec. 17, 2002 now U.S. Pat. No. 7,136,117. The entire disclosure of the prior application is hereby incorporated by reference herein in its entirety.

BACKGROUND OF THE INVENTION

1. Field of Invention

The present invention relates to an electro-optical device capable of performing active matrix drive. The invention also relates to an electronic apparatus incorporating such an electro-optical device.

2. Description of Related Art

The related art includes an electro-optical device including a pair of substrates constructed to sandwich an electro-optical material, such as a liquid crystal, therebetween and electrodes provided in each of the pair of substrates to apply an electric field to the electro-optical material. The electrodes are used to apply an electric field to the electro-optical material to vary the state of the material. According to such an electro-optical device, for example, when the light emitted from a light source enters the device and the state of the electro-optical material is varied, it is possible to control the light transmittance and thus realize desired image display.

Moreover, in related art electro-optical devices, by providing pixel electrodes arranged in a matrix shape, thin-film transistors (hereinafter "TFT") connected to the respective pixel electrodes, and scanning lines and data lines connected to each of TFTs and provided in parallel to a row direction and a column direction, respectively, on one of the pair of substrates, active matrix drive can be performed. As a result, for each pixel defined by the pixel electrodes or the scanning lines and the data lines, it is possible to control the electric field applied to the electro-optical material and to control the light transmittance.

SUMMARY OF THE INVENTION

However, in the related art electro-optical devices, there are the following problems. That is, for an electro-optical device capable of performing the above active matrix drive, it is required to precisely drive the TFTs. However, precisely driving the TFTs is a difficult task while satisfying the high precision and miniaturization requirements imposed in related art electro-optical devices.

A TFT includes a semiconductor layer having a channel area, a source area and a drain area, and a gate electrode formed through an insulating film to cover at least a part of the channel area of the semiconductor layer. By applying or not applying the electric field to the channel area in accordance with the current applied (or not applied) to the gate electrode, the current flow can be controlled.

At this time, the length of the channel area, referred to as "channel length" or a width thereof, referred to as "channel width", that is, the size of the channel area is, is important to determine the characteristics of TFTs. Further, an arrangement of the gate electrode on the channel area is also a very important factor. In this regard, in the related art, a conductive member electrically connected to the scanning line or a member constituting a part of the scanning line, can be used as the gate electrode. However, there are problems in arranging the scanning line itself and the channel area.

In short, it is beneficial or required to realize a suitable arrangement of the channel area (or TFT) and the scanning line (or gate electrode) while realizing the high precision required in the electro-optical devices. Further, it is beneficial or required to realize the difficult task of precisely operating the TFT constructed as such.

For example, it is not sufficient to only drive the electro-optical device by the TFT, and the scanning line (or the gate electrode) and various elements are additionally required. However, it is generally difficult to accomplish the above arrangement or adjustment in connection with various other elements. Further, in the TFT, there is a disadvantage if it is required to prevent the light leakage current which is generated by the light entering the channel area. That is, it is preferable that the TFT is arranged as far as possible from a light-transmitting area, which is an area that the light contributes to image display in each pixel emitted through transmission or reflection, more specifically, from the pixel electrode. However, since this should be realized while satisfying the requirement of high precision, there is a further disadvantage in that the above arrangement/adjustment becomes an even more difficult task.

The present invention address the above and/or other problems, and provides an electro-optical device capable of easily adjusting the arrangement of a gate electrode and a scanning line and capable of precisely driving TFT and an electronic apparatus including the electro-optical device.

In order to address or solve the above problems, the electro-optical device of the present invention includes, on a substrate, scanning lines extending in a predetermined direction, data lines extending in a direction intersecting the scanning lines, thin-film transistors formed correspondingly to intersecting areas of the scanning lines and the data lines, and pixel electrodes formed correspondingly to the thin-film transistors. The respective scanning line has a broad width portion as a gate electrode in a portion facing a channel area of the respective thin-film transistor and a narrow width portion in the other portion.

According to the electro-optical device of the present invention, by supplying scan signals and image signals to the thin-film transistors through the scanning lines and the data lines, the pixel electrodes can be driven in an active matrix mode.

More specifically, in the present invention, since the scanning lines have the broad width portions as the gate electrode in a portion facing the channel area of the thin-film transistor and the narrow width portion in other portion, it is not only possible to realize the narrowness of the scanning line but also to more easily adjust/determine the arrangement between the channel area (or the thin-film transistor) and the scanning line than in the related art.

For example, when a plurality of pixel electrodes are arranged in a matrix shape, it is generally preferable that the thin-film transistor are configured such that the channel area of the thin-film transistor is positioned at the position farthest from the corner of each pixel electrode, that is, at the center position of a space among adjacent and opposite corners of the pixel electrodes when four pixel electrodes are considered (because it is farthest from the light transmitting area). However, in this case, by allowing the channel area to extend through a space between adjacent pixel electrodes including the center position, it is possible to adequately determine the channel length, and by arranging the scanning line to intersect it, it is possible to realize a structure that the broad width portion of the scanning line exists on the channel area. Therefore, in this case, it is possible to simultaneously realize the trade-off requirements in securing the adequate channel length, that is, securing an adequate operation characteristic of the thin-film transistor and the narrowness of the scanning line, required for high precision or miniaturization of the electro-optical devices. Further, in this case, the light incidence to the thin-film transistor or the channel area can be prevented as much as possible or reduced under the above-described assumption.

Like the above, according to the present invention, it is possible to adequately adjust the arrangement between the thin-film transistor and the scanning line or the gate electrode while satisfying the high precision requirements of the electro-optical devices. Further, this structure renders a good outcome even after arrangement of various elements constituting the electro-optical device has been adjusted and determined, in addition to the above scanning line and the thin-film transistor. Furthermore, according to the present invention, it is possible to precisely drive the thin-film transistor, and thus maintain the quality of image to be displayed at high level.

Further, in the present invention, "broad width" means that it is broader than the width of the "narrow width portion," and "narrow width" means that it is narrower than the width of the "broad width portion". In short, the broad and narrow degree of "the broad width portion" and the "narrow width portion" is determined in accordance with the relative relationship between them. Furthermore, the real width of the broad width portion or the narrow width portion can be adequately determined theoretically, experimentally or by simulation.

In one aspect of the electro-optical device of the present invention, the broad width portion has a portion lengthened from the narrow width portion.

According to this aspect, it is possible to form the scanning line relatively easily having the broad width portion and the narrow width portion. More specifically, for example, by employing known, related art or later developed photolithography and etching methods with the assumption that the broad width portion and the narrow width portion are formed through the incorporated pattern, the scanning line according to the present aspect can be easily formed.

In another aspect of the electro-optical device of the present invention, the broad width portion has a portion connected to the narrow width portion.

According to this aspect, for example, the broad width portion includes the portion formed by connecting a conductive member and the like prepared separately to the narrow width portion. Even in this case, the broad width portion can be formed relatively easily.

In another aspect of the electro-optical device of the present invention, the scanning line extends in a direction intersecting the direction in which the channel area extends and the broad width portion extends in a single direction or bi-directionally in which the channel area extends.

According to this aspect, since the broad width portion extends in the single direction or bi-directionally in which the channel area extends, it is possible to more adequately adjust the arrangement of the thin-film transistor and the scanning line. Further, according to this aspect, since the gate electrode is adequately formed in accordance with the channel length, the electric field can be more effectively applied to the channel area.

Further, like the above, according to the aspect that the gate electrode, that is, the broad width portion is provided in the portion to be the channel area corresponding to the channel area, for example, the so-called self-aligned formation of the thin-film transistor (that is, formation of the source area and the drain area adjacent to the channel area through an ion implantation process using the gate electrode as a mask) can be easily executed. However, in this case, strictly speaking, the channel area is formed by carrying out the ion implantation process after forming the broad width portion to be the gate electrode.

In another aspect of the electro-optical device of the present invention, the pixel electrodes are arranged in a matrix shape and the channel areas are formed in an intersecting area in which a first long gap extending through a space between pixel electrodes sandwiching of the scanning line and being adjacent to each other and a second long gap extending through a space between pixel electrodes sandwiching the data line and being adjacent to each other are intersected.

This aspect is similar to the above mentioned aspect and is one of the aspects in which the operational effect of the present invention is exhibited most effectively.

That is, according to this aspect, the channel area of the thin-film transistor is formed in the intersecting area of the pixel electrodes arranged in a matrix shape. The intersecting area is an area in which the first long gap extending through a space between pixel electrodes sandwiching the scanning line and being adjacent to each other and the second long gap extending through a space between pixel electrodes sandwiching the data line and being adjacent to each other are intersected in plan view. By such a configuration, it is difficult for light to enter the channel area.

Further, along with such an operational effect, since the scanning line has the broad width portion as the gate electrode is opposite to the channel area, the arrangement between the channel area (or the thin-film transistor) and the gate electrode (or the scanning line) can be determined most adequately and it is also possible to secure the adequate channel length and narrowness of the scanning line.

In this aspect, in particular, the narrow width portion is formed at a position deviated from a center of the first gap and the broad width portion, is formed at the center of the first gap in the intersecting area.

According to this configuration, the narrow width portion of the scanning line extends through the space between the adjacent pixel electrodes but does not exist at the center thereof and is formed at the position deviated from the center thereof. As a result, first, the enhancement in the quality of the displayed image can be obtained, especially for the liquid crystal display device that is an example of the electro-optical device, and the reason thereof is as follows.

That is, in the present aspect, when performing the rubbing process on a convex portion on the oriented film normally provided in the liquid crystal display device, in particular, a convex portion formed by "height" of the narrow width portion, nonuniformities are usually generated in the convex portion. Further, it is considered that the degree of nonuniformity is different from each other in the portion associated with the rubbing up convex portion (that is, the direction ascending to the convex portion) and the portion associated with the rubbing down convex portion (that is, the direction descending from the convex portion).

More specifically, for example, it is more difficult to generate nonuniformity in the portion associated with the rubbing up convex portion than in the portion associated with the rubbing down convex portion.

Further, if the nonuniformity is left as it is, a poor orientation of the liquid crystal may be caused to result in the operation failure of the electro-optical devices. In the difference in the degree of nonuniformity between the rubbing-up process and the rubbing-down process, the latter has greater possibility to cause the bad orientation of the liquid crystal than the former.

It is significant that the narrow width portion of the present aspect is formed at a position deviated from the center of the first gap between the pixel electrodes. That is, if the narrow width portion is formed at the above-described position, the vertex of the convex portion caused by the narrow width portion is also formed at the position deviated from the center of the first gap, and this means that it is possible to form almost only half inclined surface of the convex portion on the area corresponding to the first gap, that is, to form only the portion associated with the rubbing-down on the area. Further, in this case, if the light-shielding film is provided corresponding to the first gap, it is possible to effectively shield only the portion associated with the rubbing-down, that is, to effectively shield the corresponding portion of the convex portion to be most influenced by the nonuniformity.

As a result, according to the present aspect, since the operation failure of the electro-optical device caused by nonuniformities can be substantially prevented or reduced, and the portion of the convex portion associated with the rubbing-up, which is not affected by nonuniformities, is able to transmit the light contributing to the image display. Thus, it is possible to enhance the opening ratio of pixel, that is, to provide a brightened image display. As a result, according to the present aspect, from the above-mentioned point of view, the enhancement in the display image can be obtained.

Further, by forming the narrow width portion at the position deviated from the center of the first gap, it is also possible to enhance the degree of freedom in designing the electro-optical devices and to more effectively prevent or reduce light from entering the thin-film transistor. The reason thereof is as follows.

That is, in the present aspect, the narrow width portion extends through the first gap between the adjacent pixel electrodes, but does not exist at the center thereof. For this reason, by using the area in the first gap where the narrow width portion is not provided, in a plan view, it is possible to provide other wires, such as the capacitive line made up of the same film as the narrow width portion, in parallel to the narrow width portion. That is, the degree of freedom of design is increased.

Further, in the above-mentioned case, although the narrow width portion is deviated from the center thereof, it is possible to arrange the broad width portion as the gate electrode at the center of the gap, by adjusting the width of the broad width portion, for example, by broadening only one side or by broadening one side more than the other small side. Like the above, since the gate electrode can be arranged at a position advantageous to increase the light-shielding ability regardless of the position of the scanning line, or since the scanning line can be arranged at an arbitrary portion in the gap while arranging the gate electrode at the position advantageous for increasing the light-shielding ability, it is possible to realize a thin-film transistor having a high light-shielding ability while increasing the degree of freedom in arranging wires including the arrangement of the scanning lines.

In this configuration, further, the broad width portion may be formed at the center of the second gap in the intersecting area.

According to such construction, the channel area is formed at the position farthest from the adjacent or opposite corners of the electrodes in accordance with the above-described method, when four pixel electrodes are considered to be used. That is, it becomes very difficult for light to enter the channel area.

In another aspect of the electro-optical device of the present invention, grooves are formed in the substrate along the scanning lines, and the scanning lines are buried at least partially in the grooves directly or through an interlayer insulating film.

According to this aspect, since the scanning line is buried in the groove formed in the substrate, the generation of a step on the surface of the interlayer insulating film formed as the upper layer or on the surface of the pixel electrodes and the oriented film, etc. caused by the height of the scanning line itself can be prevented or reduced earlier. That is, the surface can be leveled very well. Then, if the surface of the oriented film is leveled, the rubbing process can be adequately performed for the orientation process and the orientated state of the liquid crystal molecules contacting the oriented film can be maintained well. Therefore, according to the present aspect, since the possibility of bad orientation can be decreased and the light leakage caused by the bad orientation can be markedly prevented or reduced, it is possible to display a high-quality image.

In another aspect of the electro-optical device of the present invention, the narrow width portion has a buried portion buried in the groove and extending along the scanning line and a non-buried portion not buried in the groove and extending along the scanning line in parallel to a buried portion, and a base of the pixel electrode is positioned high along the scanning line due to the presence of the non-buried portion.

According to this aspect, the narrow width portion has both the buried portion and the non-buried portion. Then, both of the buried portion and the non-buried portion extend along the scanning line and the base of the pixel electrode protrudes above along the scanning line due to the presence of the non-buried portion.

Through this construction, first, the effect associated with the above-described leveling can be similarly obtained by the buried portion. That is, the surface of the interlayer insulating film to be formed as the upper layer of the buried portion, or the surfaces of the pixel electrodes and the oriented film have the an excellent leveled feature, and thus it is possible to reduce the possibility of having the bad orientations.

Next, since the step including the convex portion along the scanning line is formed on the surface of the oriented film to be formed as the upper layer of the non-buried portion and the like, the above-described effects of leveling cannot be obtained by the non-buried portion. However, the following advantages can be obtained.

First, in electro-optical device according to the present invention, for the purpose of preventing or reducing deterioration of the liquid crystal, increasing the device life and reducing the cross-talk or flicker of the displayed image, a method of dividing the pixel electrodes into two groups and then inversely driving them in separate cycles may be employed. That is, a plurality of pixel electrodes including a first pixel electrode group to be inversely driven at a first period and a second pixel electrode group to be inversely driven at a second period compensatory with the first period, are arranged in a plain on the substrate. There are (i) the adjacent pixel electrodes to be driven with driving voltages of inverse polarities at the respective times in the inverse-driving, and (ii) the adjacent pixel electrodes to be driven with driving voltages of the same polarity at the respective times in the inverse driving. If the pixel electrodes corresponding to (i) are arranged in the direction along the data lines and the pixel electrodes corresponding to (ii) are arranged in the direction along the scanning lines, the pixel electrodes arranged in the direction along any one scanning line are driven with one polarity and the pixel electrodes arranged in the direction along another scanning line adjacent to the any one scanning line are driven with an inverse polarity to the one polarity (referred to as "1H inverse driving").

However, in this case, between the pixel electrodes adjacent to each other along the data line, the horizontal electric field based on the driving voltages of inverse polarities is generated. Such horizontal electric field may interfere the electric field (may be referred to as vertical electric field in contrast to the horizontal electric field) generated between the pixel electrode and the opposing electrode, and as a result, it becomes difficult to obtain the orientation state of the liquid crystal molecules as desired, so that the image display may be affected.

Further, in the present aspect, in a case that such adverse effects may be caused, the convex portion formed on the base of the pixel electrode along the scanning line has a distinct significance.

That is, first, when the edge portions of the respective pixel electrodes are formed to be positioned on the step, the vertical electric field generated between the respective pixel electrodes and the opposing electrode is intensified compared to the horizontal electric field generated between the adjacent pixel electrodes (in particular, the pixel electrodes included in the different pixel electrode group). That is, since the electric field generally intensifies as the distance between the electrodes becomes shorter, the edge portions of the pixel electrodes near the opposing electrode by the height of the step generates an intense vertical electric field. Second, whether the edge portions of the respective pixel electrodes are positioned on the step or not, the horizontal electric field generated between the adjacent pixel electrodes (in particular, the pixel electrodes included in a different pixel electrode group) is weakened by the presence of the step in accordance with the dielectric constant, and even by reducing (replacing partially from the step) the volume of the electro-optical material through which the horizontal electric field passes, the effect that the horizontal electric field has on the electro-optical material can be reduced. Therefore, the operation failure from the electro-optical material, such as the bad orientation of the liquid crystal by the horizontal electric field caused by the inverse driving method, can be reduced. At this time, as described above, the edge portions of the pixel electrodes may be or not be positioned on the step and may be positioned on the inclined step or on an almost vertical side surface thereof.

In addition, since the light-shielding film to conceal the operation failure caused by the electro-optical material, can be formed small, it is also possible to increase the opening ratios of the respective pixels without having the bad image display, caused by the light leakage, generated.

As described above, according to the present aspect, first, due to the presence of the buried portion, the effects associated with the above-described leveling can be obtained, and second, by forming intentionally the step including the convex portion along the scanning line by the presence of the non-buried portion, the generation of the horizontal electric field can be prevented or reduced.

In another aspect of the electro-optical device of the present invention, a capacitor electrode on a pixel potential side constituting a storage capacitor connected to the pixel electrode and a capacitive line having capacitor electrode on a fixed potential side arranged constituting the storage capacitor arranged opposing the capacitor electrode on the pixel potential side through a dielectric film, may be further provided. The capacitive line has a main line portion extending along the scanning line and a portion extending along the data line, and a width of the portion extending along the data line in the capacitive line is equal to or broader than that of the data line.

According to this aspect, since the storage capacitor, having a construction such that the capacitor electrode on the pixel potential side and the capacitor electrode on the fixed potential side are arranged opposite to each other, is connected to the pixel electrode, the voltage of the image signal written in the pixel electrode can be maintained for a long time. In particular, in the present aspect, since the width of the portion extending along the data line in the capacitive line is equal to or broader than that of the data line, it is possible to further lower the resistance of the capacitive line. Further, in the present aspect, since a low resistance of the capacitive line can be realized as described above, from the point of view of the whole device, the narrowness of the capacitive line and further narrowness of the storage capacitor can be accomplished, and as a result, it is possible to enhance the opening ratio. In the "narrowness of the capacitive line", since the capacitive line itself has a width equal to or "broader than" the width of the data line on the surface, it may appear to be a contradiction, but the broad width and the narrow width should be determined from the relative relationship between the capacitive line and the data line, such that from the point of view of the whole device, the "narrowness of the capacitive line" can be accomplished, compared to the related art. Furthermore, in the broad width and narrow width described above or the "broader than" to be described in the present invention, the discrete values of the width can be adequately determined theoretically, experimentally, experientially or by simulation.

Further, according to the present aspect, it is possible to effectively prevent or reduce the light from entering the thin-film transistor, in particular the channel area thereof, compared to the related art, as well as obtaining the above-described low resistance. This is because, as described above, although in the conventional art, the light reflected from the back of the data line and the like becomes a stray light and thus may enter the thin-film transistor, but according to the present aspect, the possibility that the advance of such stray light is shielded by the capacitive line formed in the width equal to or broader than that of the data line is increased.

From the above, according to the present invention, the problems, such as the cross-talk or burn-in that were prevalent in the related art, can be reduced by the low resistance of the capacitive line. Further, since the light leak current in the thin-film transistor is reduced, it is possible to display a high quality image.

Further, in the present invention, since the portion extending along the data line exists in the capacitive line, the area of the storage capacitor can be increased. This markedly contributes to the image display having high quality.

Furthermore, in order to more effectively accomplish the light-shielding function described above, materials having a good light-shielding feature may be employed for the capacitive line. For example, single metal, alloy, metal silicide, poly-silicide or laminated layer thereof, containing at least one from Al (aluminum), Cu (copper), Ti (titan), Cr (chrome), W (tungsten), Ta (tantalum), and Mo (molybdenum) can be adequately employed. Further, in addition to the above, for example, light-absorbing materials such as poly-silicon can be employed.

In this aspect, a portion overlapping the thin-film transistor in the data line may be formed locally broad, and a width of the portion extending along the data line in the capacitive line may be broader than that of the portion not formed broad in the data line and equal to that of the portion formed broad in the data line.

By such a construction, the portion overlapping the thin-film transistor in the data line is formed locally broad. Then, the width of the portion formed broad is equal to that of the portion extending along the data line in the above-described capacitive line. That is, from this construction, the data line and the capacitive line all formed broad are positioned on the thin-film transistor. Thus, the light entered from the upper portion of the thin-film transistor can be more securely prevented or reduced.

More specifically, for example, when the capacitive line is made up of metal having a high melting point, the capacitive line can independently have the light-shielding ability that the transmittance thereof is about 0.1% (2 or more in OD (Optical Density)). However, if the silicide forming process is performed on the capacitive line, the composition thereof is varied and thus the light-shielding ability may be reduced. In this case, only the light-shielding ability having the transmittance of 0.1% or more may be obtained.

However, in the present aspect, the data line overlapping the capacitive line formed of such a metal film having a high melting point is further provided. If the construction for performing the light shielding of the thin-film transistor by overlapping the capacitive line and the data line is employed, the light-shielding ability corresponding to the added value of these transmittances can be obtained. For example, when the data line is made up of aluminum, etc., the light-shielding ability with a transmittance of 0.001% or less (4 or more in the OD value) can be accomplished.

Further, in the present aspect, in particular, that the broad width of the portion extending along the data line in the capacitive line is broad means that it is broader than that of the portion not formed broad in the data line.

Also, a portion overlapping the thin-film transistor in the data line is formed locally broad, and a width of the portion extending along the data line in the capacitive line is broader than that of the portion not formed broad in the data line and narrower than that of the portion formed broad in the data line.

According to this aspect, the portion overlapping the thin-film transistor in the data line is formed locally broad. That is, from this construction, the data line and the capacitive line all formed broad are positioned on the thin-film transistor. Therefore, the light entered from the upper portion of the thin-film transistor can be more securely prevented or reduced.

Furthermore, in the present aspect, in particular, the width of the portion extending along the data line in the capacitive line is formed narrower than that of the data line. That is, in the portion, the width of the data line is narrower than that of the capacitive line. From this construction, for example, when the data line is made up of aluminum having a high light reflexibility, a stray light generated by reflecting the incident light by any element in the electro-optical device, a light returning to the electro-optical device after a light emitted from the electro-optical device is reflected by any element outside of the electro-optical device, or in a projection type display device, such as a color-displayable liquid crystal projector including a plurality of electro-optical devices, a light emitted from other electro-optical device and generated by returning to the electro-optical device is reflected by the data line to thereby prevent the stray light from being increased. This is because the portion of the data line formed broad is relatively narrower than the capacitive line.

In this aspect that has the data line having a portion overlapping the thin-film transistor formed broad, the capacitive line is arranged at the overlapped position between the thin-film transistor and the data line, and the data line may be constructed such that the portion provided with a contact hole to connect to the thin-film transistor is formed broad in addition to the portion overlapping the thin-film transistor.

From this construction, even when the capacitive line as the light-shielding film could is not provided, the decrease in the light-shielding ability can be compensated by forming broad the data line for the contact hole.

Alternatively, for each thin-film transistor, the data line is formed continuously broad from the portion overlapping the thin-film transistor to the portion in which the contact hole is provided.

From this construction, the light shielding of the thin-film transistor can be more securely accomplished.

Further, the portion formed broad in the portion overlapping the thin-film transistor and the portion formed broad in the portion in which the contact hole is provided may be separately formed broad. If arranging the portion overlapping the thin-film transistor and the portion in which the contact hole is provided close to each other and forming them continuously broad as in the present aspect, since the area to be formed broad need not be exceedingly broad, it is advantageous from the point of view of not increasing the inner reflection.

In another aspect of the electro-optical device of the present invention, another substrate opposing the substrate through an electro-optical material and a light shielding film formed on the another substrate may be further provided, and the width of the data line and the width of a portion extending along the data line in the capacitive line are narrower than that of the light-shielding film.

From this aspect, if it is assumed that the light is entered from another substrate, the laminated structure of the light-shielding film, the data line and the capacitive line in the order from the light incidence side can be constructed. The width of the former is broader than those of the latter two. That is, the advance of the incident light is blocked by the broader light-shielding film, and only the light passing through it reaches the data line and the capacitive line. Further, when the light passing through the light-shielding film reaches the data line and the capacitive line, the data line and the capacitive line can be expected to perform the above-described light-shielding function. In short, according to the present aspect, it is possible to enhance the light resistance of the thin-film transistor and to reduce the generation of the light leakage.

Further, if the pixel electrodes are arranged in a matrix shape, the "light-shielding film" in the present aspect may be formed in a stripe shape or a lattice shape to extend through spaces between the pixel electrodes. Furthermore, according to circumstances, the light-shielding film may be formed as a laminated structure made of, for example, a light-absorbing material, such as chrome or chrome oxide, and a light-reflecting material, such as aluminum.

An electronic apparatus of the present invention may include the above-described electro-optical device (including various aspects).

According to the electronic apparatus of the present invention, for example, since it includes the electro-optical device capable of adequately adjusting the arrangement between the thin-film transistor and the scanning line, it is possible to realize various electronic apparatuses, such as a liquid crystal projector, a liquid crystal television, a portable phone, an electronic pocket book, a word processor, a view finder type or monitor direct vision-type videotape recorder, a work station, a video phone, a POS terminal, and a touch panel, capable of precise operation of the thin-film transistor and high quality image display, for example.

The above effects and other advantages of the present invention will be more apparent from the following exemplary embodiments.

DETAILED DESCRIPTION OF PREFERRED EMBODIMENTS

Preferred exemplary embodiments of the present invention are explained with reference to the drawings. In following exemplary embodiments, an electro-optical device of the present invention is applied to a liquid crystal device.

Figure 1:
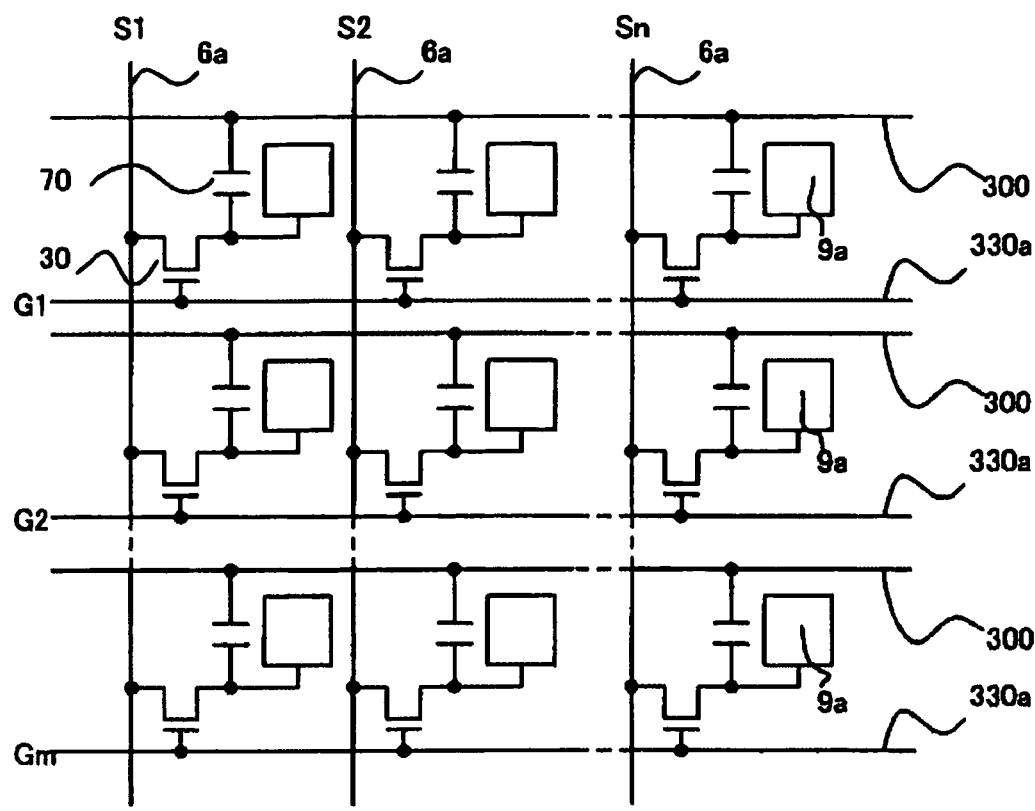
FIG. 1 is a schematic circuit diagram illustrating an equivalent circuit of various elements, wirings and the like provided in a plurality of pixels, having a matrix shape, constituting an image display area in an electro-optical device according to an exemplary embodiment of the present invention.
Figure 1:
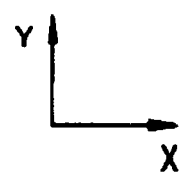
Figure 2:
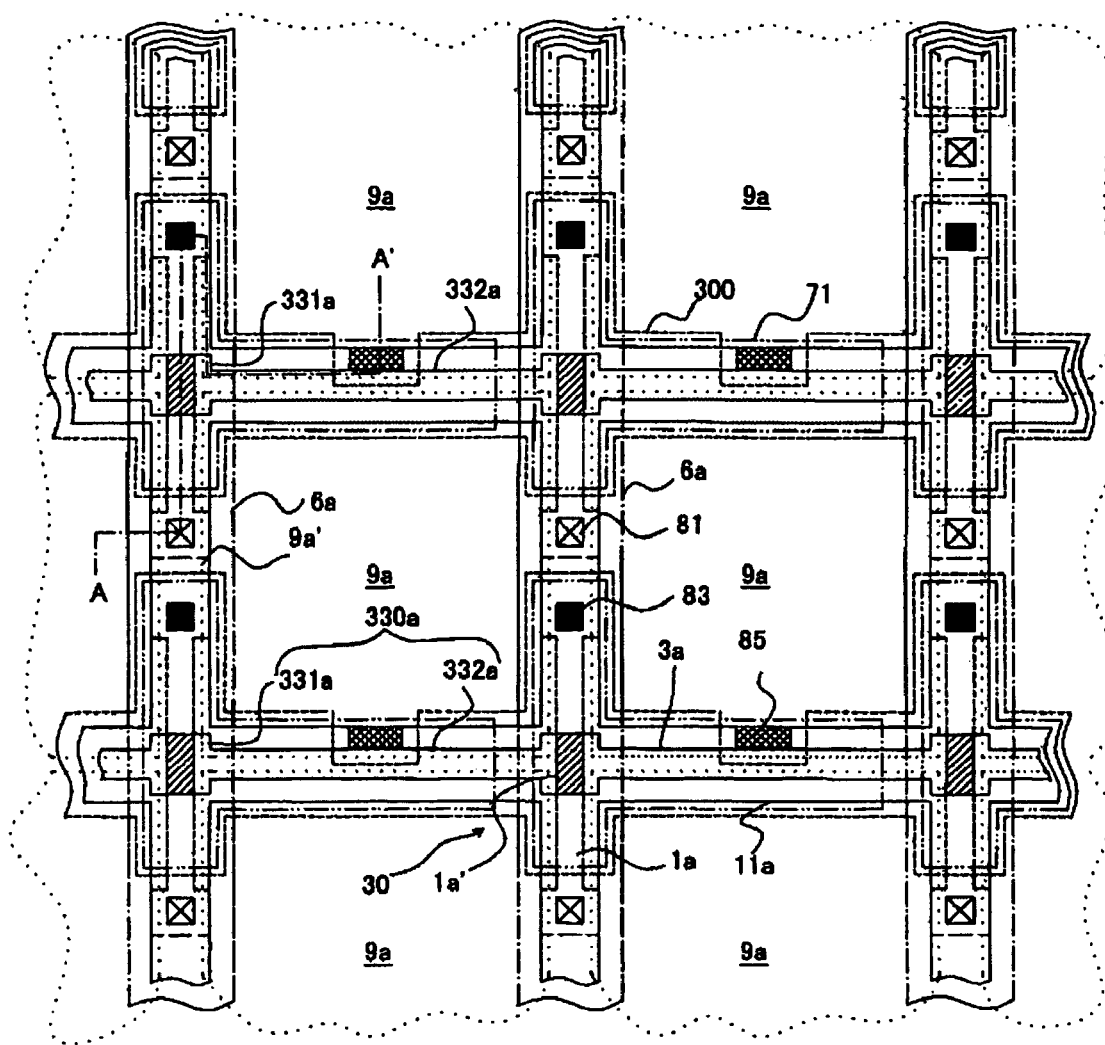
FIG. 2 is a plan view of a group of adjacent pixels in a TFT array substrate where data lines, scanning lines, pixel electrodes are formed in the electro-optical device according to an exemplary embodiment of the present invention.
Figure 3:
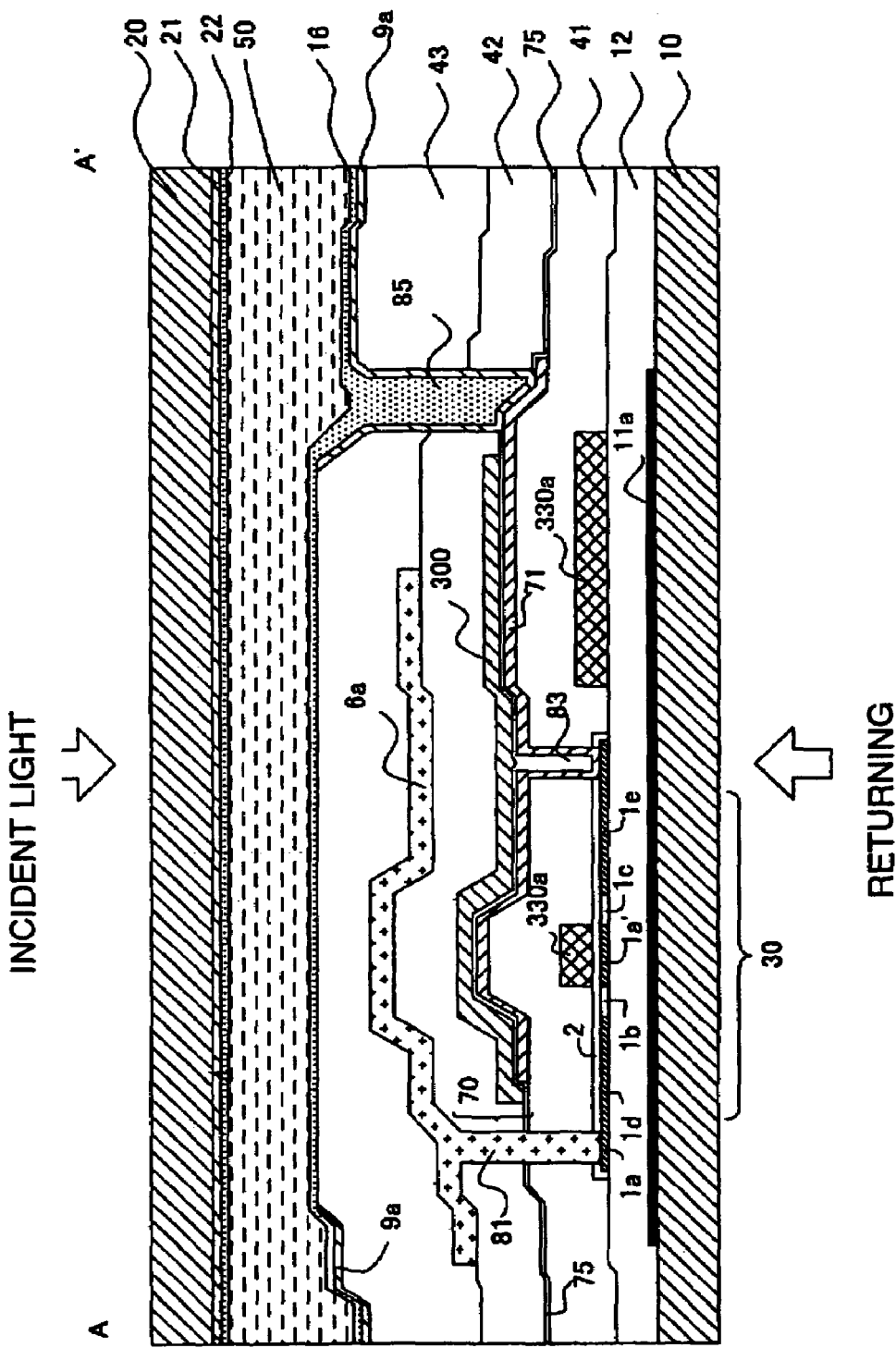
FIG. 3 is a sectional view taken along plane A-A' in FIG. 2.
Figure 4:
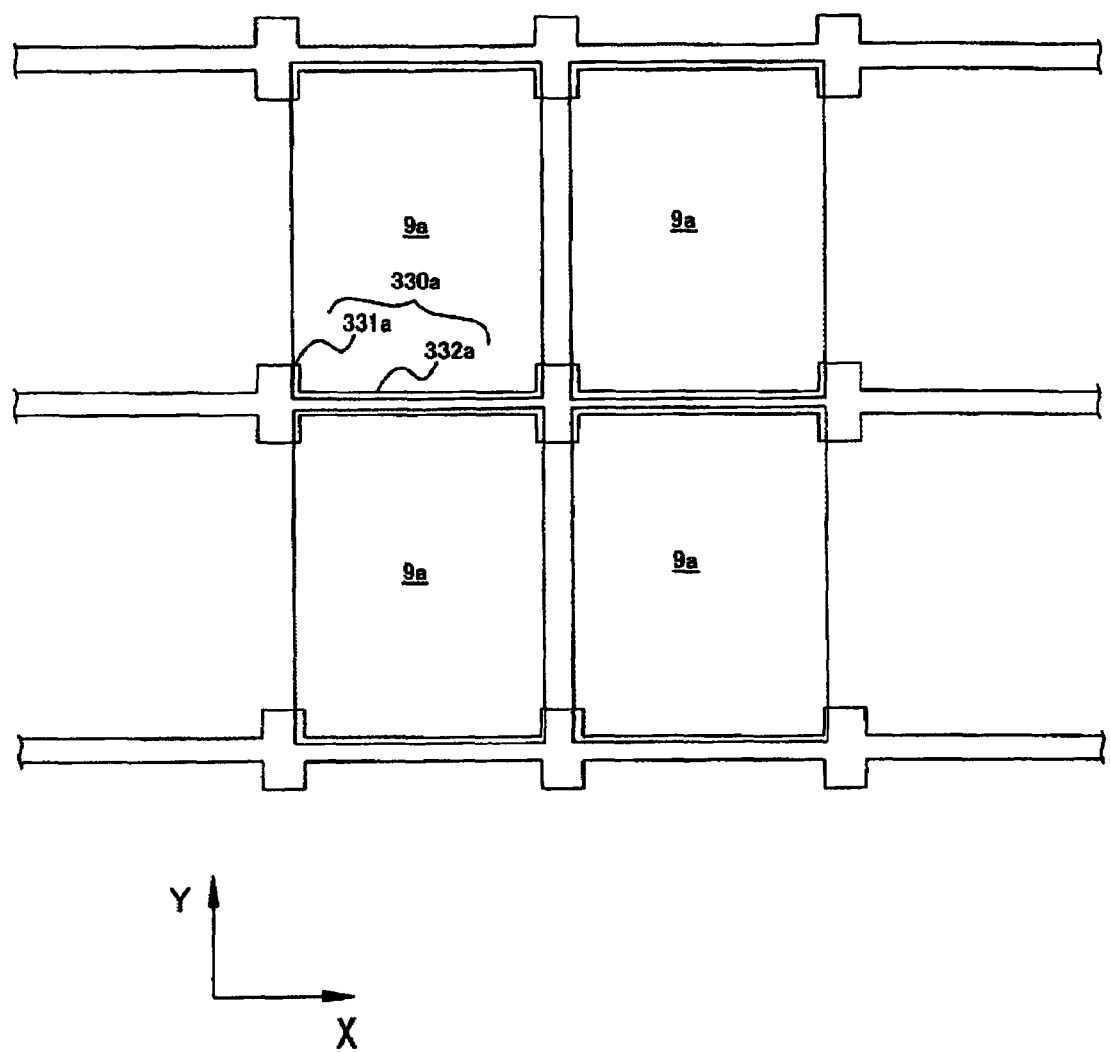
FIG. 4 is a plan view illustrating only a shape pattern of the scanning lines shown in FIG. 2.

First, a construction of a pixel part in the electro-optical device according to an exemplary embodiment of the present invention is explained with reference to FIGS. 1 to 4. FIG. 1 is a schematic that shows an equivalent circuit of various elements, wirings and the like in a plurality of pixels formed in a matrix shape constituting an image display area 10a of the electro-optical device. FIG. 2 is a plan view of a group of a plurality of pixels adjacent to each other on a TFT array substrate in which data lines, scanning lines, pixel electrodes and the like are formed. Further, FIG. 3 is a sectional view taken along plane A-A' in FIG. 2. Further, in FIG. 3, in order for each layer and each member to have recognizable sizes in the drawing, different scales are applied to each layer and each member. Furthermore, FIG. 4 is a plan view illustrating shapes of only the scanning lines extracted from FIG. 2.

In FIG. 1, in the plurality of pixels formed in a matrix shape constituting the image display area of the electro-optical device according to the present exemplary embodiment, a pixel electrode 9a and a TFT 30 to control switching of the pixel electrode 9a are formed, respectively, and data lines 6a supplied with image signals are electrically connected to sources of the TFTs 30. Image signals S1, S2, . . . , Sn to be, in this order, written may be sequentially supplied to the data lines 6a, or may be supplied to each group which has a plurality of data lines 6a adjacent to each other.

Further, scanning lines 330a are electrically connected to gates of the TFTs 30 and at a predetermined timing, scanning signals G1, G2, . . . , Gn are pulse-like applied to the scanning lines 330a in that order. The pixel electrodes 9a are electrically connected to drains of the TFTs 30, and by closing switches of the TFTs 30, that is, switching elements for a predetermined time interval, the image signals S1, S2, . . . , Sn supplied from the data lines 6a are written at a predetermined timing.

A predetermined level of the image signals S1, S2, . . . , Sn which have been written through the pixel electrodes 9a to a liquid crystal that is an example of an electro-optical material are maintained for a predetermined time interval between the pixel electrode 9a and an opposing electrode formed on an opposing substrate. The liquid crystal modulates light by varying orientation or order of molecules according to the applied voltage level, and thus it is possible to execute the gradation display. If it is in a normally-white mode, transmittance for the incident light is decreased in accordance with the voltage applied in a unit of pixel, and if it is in a normally-black mode, the transmittance for the incident light is increased in accordance with the voltage applied in a unit of pixel. Therefore, as a whole, light having a contrast responsive to the image signals is emitted from the electro-optical device.

In order to reduce or prevent the maintained image signals from being leaked, a storage capacitor 70 is added in parallel to a liquid crystal capacitor formed between the pixel electrode 9a and the opposing electrode.

A more specific construction of the electro-optical device in which the above-described circuit operation is executed by using the data lines 6a, the scanning lines 330a, the TFTs 30 and the like is explained with reference to FIGS. 2 and 3.

First, the electro-optical device according to the present exemplary embodiment, as shown in FIG. 3 which is a sectional view taken along plane A-A' in FIG. 2, includes a TFT array substrate 10 and a transparent opposing substrate 20 arranged opposite thereto. The TFT array substrate 10 is made of, for example, a quartz substrate, a glass substrate or a silicon substrate, and the opposing substrate 20 is made of, for example, a glass substrate or a quartz substrate.

As shown in FIG. 3, the TFT array substrate 10 is provided with a pixel electrode 9a, and an upper portion of the pixel electrode is provided with an oriented film 16 which has been subjected to a predetermined orientation process, such as a rubbing process. The pixel electrode 9a is made of, for example, a transparent conductive film, such as an ITO (Indium Tin Oxide) film.

The opposing substrate 20 is provided over the whole surface thereof with an opposing electrode 21, and a lower portion of the electrode is provided with an oriented film 22 which has been subjected to a predetermined orientation process, such as a rubbing process. The opposing electrode 21 is made of, for example, a transparent film, such as an ITO film.

Next, in FIG. 2, a plurality of pixel electrodes 9a (profiles thereof are indicated by dotted lines 9a') are provided in a matrix shape on the TFT array substrate 10 of the electro-optical device, and data lines 6a of aluminum films and scanning lines 330a of poly-silicon films are provided along horizontal and vertical boundaries of the pixel electrodes 9a.

Each scanning line 330a is arranged opposite to a channel area 1a' indicated by oblique lines area extending from lower left to upper right in the semiconductor layer 1a of a poly-silicon film and functions as a gate electrode. That is, in portions where the scanning lines 330a and the data lines 6a are intersected, TFTs 30 to switch pixels where broad width portions 331a (to be explained later) of the scanning lines 330a are arranged opposite to the channel areas 1a' as gate electrodes are provided. In other words, TFTs 30 in the present exemplary embodiment, in particular, the channel areas 1a' thereof are formed in intersecting areas of the plurality of pixel electrodes 9a arranged in a matrix shape. The intersecting area means an area where, in plan view, a first long gap (X direction in FIG. 2) extending through a space between adjacent pixel electrodes 9a sandwiching the scanning lines therebetween and a second long gap (Y direction in FIG. 2) extending through a space between adjacent pixel electrodes sandwiching the data line 6a therebetween, are intersected.

More specifically, with reference to FIG. 2, the intersecting area corresponds to, for example, a position farthest from each of a lower-right corner of the pixel electrode 9a shown on the upper-left side of the plan view, a lower-left corner of the pixel electrode 9a shown on the upper-right side, an upper-right corner of the pixel electrode 9a shown on the lower-left side and an upper-left corner of the pixel electrode 9a shown on the lower-right side of the plan view. Since the TFT 30 is formed at such position, it is difficult for an incident light to directly enter the channel area 1a' of the TFT.

The TFT 30, as shown in FIG. 3, has an LDD (Lightly Doped Drain) structure, and includes a channel area 1a' of the semiconductor layer 1a where a channel is formed by an electric field from the scanning line which functions as a gate electrode as described above, an insulating film 2 having a gate insulating film to insulate the scanning line 330a from the semiconductor layer 1a, a low-concentration source area 1b, a low-concentration drain area 1c, a high-concentration source area 1d and a high-concentration drain area 1e.

Further, although it is preferable that the TFT 30 has the LDD structure as shown in FIG. 3, the TFT 30 may have an offset structure in which impurities are prevented or substantially prevented from being infiltrated into the low-concentration source area 1b and the low-concentration drain area 1c, or may be a self-alignment type TFT to infiltrate impurities at high concentration using the gate electrode constituting a part of the scanning line 330a as a mask to automatically form the high-concentration source area and the high-concentration drain area. Furthermore, although, in the present exemplary embodiment, the TFT 30 has a single gate structure where only one gate electrode of the TFT 30 for pixel switching is disposed between the high-concentration source area 1d and the high-concentration drain area 1e, the TFT may have a dual, triple or more gate structure where two or more gates are disposed therebetween. Furthermore, the semiconductor layer 1a constituting the TFT 30 is not limited to the poly-silicon film, but may be made of an amorphous silicon film or a monocrystalline silicon film. A related art, later developed, or known method, such as a pasting method can be employed in formation of the monocrystalline silicon film. By employing the monocrystalline silicon film for the semiconductor layer 1a, it is possible to promote a high performance of the peripheral circuits.

In the present exemplary embodiment, for the scanning line 330a serving as the gate electrode of the TFT 30, a portion serving as the gate electrode, that is, a portion facing the channel area 1a' of the TFT 30 is formed broader than the other portion, as shown in FIG. 2. That is, in FIG. 2, the scanning line 330a has a broad width portion 331a extending in the Y direction in FIG. 2 to correspond to the channel area 1a' extending in the Y direction in FIG. 2 and a narrow width portion 332a extending through a space between the adjacent pixel electrodes 9a. In FIG. 4, for the purpose of simplifying the illustration, only the shape pattern of the scanning line 330a is shown.

In this connection, in the present exemplary embodiment, the broad width portion 331a is lengthened from the narrow width portion 332a. That is, the broad width portion 331a and the narrow width portion 332a are integrally formed. Such a shape can be easily formed, for example, by using a related art, later developed, or known photolithography and etching, on the assumption that a pattern having an integrated shape 332a (see FIG. 4) composed of the broad width portion 331a and the narrow width portion 332a is formed. However, the present invention is not limited to such shape, and includes, for example, even shapes where the broad width portion 331a is formed by connecting other conductive member prepared separately to the narrow width portion 332a, within the scope thereof.

The storage capacitor 70 shown in FIG. 1 is constructed such that a junction layer 71 as the capacitor electrode on the pixel potential side connected to the high-concentration drain area 1e of the TFT 30 and the pixel electrode 9a and a part of the capacitive line 300 as the capacitor electrode on the fixed potential side are arranged opposite to each other via an dielectric film 75, as shown in FIG. 3. By the storage capacitor 70, it is possible to markedly enhance the potential maintenance characteristics in the pixel electrode 9a.

The junction layer 71 is made up of, for example, the conductive poly-silicon film and serves as a capacitor electrode on the pixel potential side. However, similar to the capacitive line 300 to be explained in detail below, the junction layer 71 may be made of a single layer film or multi-layer film containing metal or alloy. In addition to the function as a capacitor electrode on the pixel potential side, the junction layer 71 also has a function of connecting the pixel electrode 9a and the high-concentration drain area 1e of the TFT 30 to each other through contact holes 83 and 85.

By using such junction layer 71, even if the distance between layers is as long as, for example, 2000 nm, both layers can be connected well to each other through serial contact holes having two relatively small diameters while avoiding the technical difficulty of connecting both layers to each other through one contact hole, so that an opening ratio of pixel can be increased. Further, in opening the contact hole, it is helpful to prevent or reduce punchthrough in etching.

The capacitive line 300 is made of, for example, a conductive film containing metal or alloy, and serves as a capacitor electrode on the fixed potential side. The capacitive line 300 is formed overlapping an area to form the scanning line 330a from a plan view, as shown in FIG. 2. More specifically, the capacitive line 300 has a main line portion extending along the scanning line 330a, a protruding portion protruded upwardly in the Y direction along the data line 6a from a portion intersecting the data line 6a and a constricted portion where the portion corresponding to the contact hole 85 is slightly constricted. The protruding portion contributes to increase in the area to form the storage capacitor 70 by using the area on the scanning line 330a and the area below the data line 6a.

Further, the capacitive line 300 is made of, for example, single metal, alloy, metal silicide, poly-silicide or laminated layer thereof, containing at least one of metals having high melting point, such as Ti, Cr, W, Ta, Mo, and in addition to the function as a capacitor electrode on the fixed potential side of the storage capacitor 70, the capacitive line 300 has a function as a light-shielding layer to shield the TFT 30 from the incident light on the upper side of the TFT 30. However, the capacitive line 300 may have a multi-layer structure in which a first film made of a conductive poly-silicon film and the like and a second film made of a metal silicide film containing metal and the like having high melting point are stacked.

Furthermore, preferably, the capacitive line 300 extends from the image display area in which the pixel electrodes 9a are arranged to peripheries thereof, and is electrically connected to a potentiostatic source to be a fixed potential. Such potentiostatic source may be a potentiostatic source, such as a plus power source or a minus power source supplied to a data line driving circuit to be explained later, or may be a potentiostatic source supplied to the opposing electrode 21 of the opposing substrate 20.

A dielectric film 75, as shown in FIG. 3, is constructed of a silicon oxide film such as a HTO (High Temperature Oxide) film or a LTO (Low Temperature Oxide) film having, for example, a relatively thin thickness of about 5~200 nm, or a silicon nitride film. From the point of view of increasing the capacitance of the storage capacitor 70, the dielectric film 75 should be preferably as thin as possible as long as the reliability of the film is sufficiently maintained.

In FIGS. 2 and 3, in addition, the lower side of the TFT 30 is provided with a lower light-shielding film 11a. The lower light-shielding film 11a is patterned in a lattice shape, and as a result, the opening area of each pixel is defined. Further, the opening area may be defined by the intersection of the data line 6a extending in the Y direction in FIG. 2 and the capacitive line 300 extending in the X direction in FIG. 2. Furthermore, similar to the case of the above-described capacitive line 300, the lower light-shielding film 11a may be formed extending from the image display area to the peripheries thereof to be connected to a potentiostatic source so that the potential variation has no adverse effects on the TFT 30.

Further, a base insulating film 12 is provided below the TFT 30. In addition to the function of insulating the TFT 30 from the lower light-shielding film 11a, since the base insulating film 12 is formed on the whole surface of the TFT array substrate 10, the base insulating film 12 has a function of preventing or reducing the characteristic variation of the TFT 30 for pixel switching caused by rough polished surface of the TFT array substrate 10 or contaminants left after washing.

In addition, a first interlayer insulating film 41 which has a contact hole 81 communicating with the high-concentration source area 1d and a contact hole 83 communicating with the high-concentrating drain area 1e, respectively, is formed on the scanning line 330a.

The junction layer 71 and the capacitive line 300 are formed on the first interlayer insulating film 41, and a second interlayer insulating film 42 which has a contact hole 81 communicating with the high-concentration source area 1d and a contact hole 85 communicating with the junction layer 71 are formed respectively on the junction layer 71 and the capacitive line 300.

Furthermore, in the present exemplary embodiment, by baking the first interlayer insulating film 41 at about 1000° C., activation of ions injected into the poly-silicon film constituting the semiconductor layer 1a or the scanning line 330a may be intended. On the other hand, by not baking the second interlayer insulating film 42, relief of stress occurring in the vicinity of the interface of the capacitive line 300 may be intended.

The data line 6a is formed on the second interlayer insulating film 42, and above them a third interlayer insulating film 43 which has a contact hole 85 communicating the junction layer 71 is formed.

The surface of the third interlayer insulating film 43 is leveled by means of CMP (Chemical Mechanical Polishing) process, and as a result, the orientation failure of the liquid crystal layer 50 caused by a step generated by various wirings or elements below the third interlayer insulating layer 73 can be reduced.

However, in place of performing the leveling process for the third interlayer insulating film 43, or in addition to it, a groove, in at least one of the TFT array substrate 10, the base insulating film 12, the first interlayer insulating film 41 or the second interlayer insulating film 42, can be formed to buried the wirings, such as the data line 6a or the TFT 30 to perform the leveling process.

According to the electro-optical device of the present exemplary embodiment as constructed like the above, since the scanning line 330a has the broad width portion 331a and the narrow width portion 332a and the broad width portion 331a is formed to face the channel area 1a' of the TFT 30, the arrangement between the TFT 30 and the scanning line 330a can be easily adjusted or determined.

Figure 5:
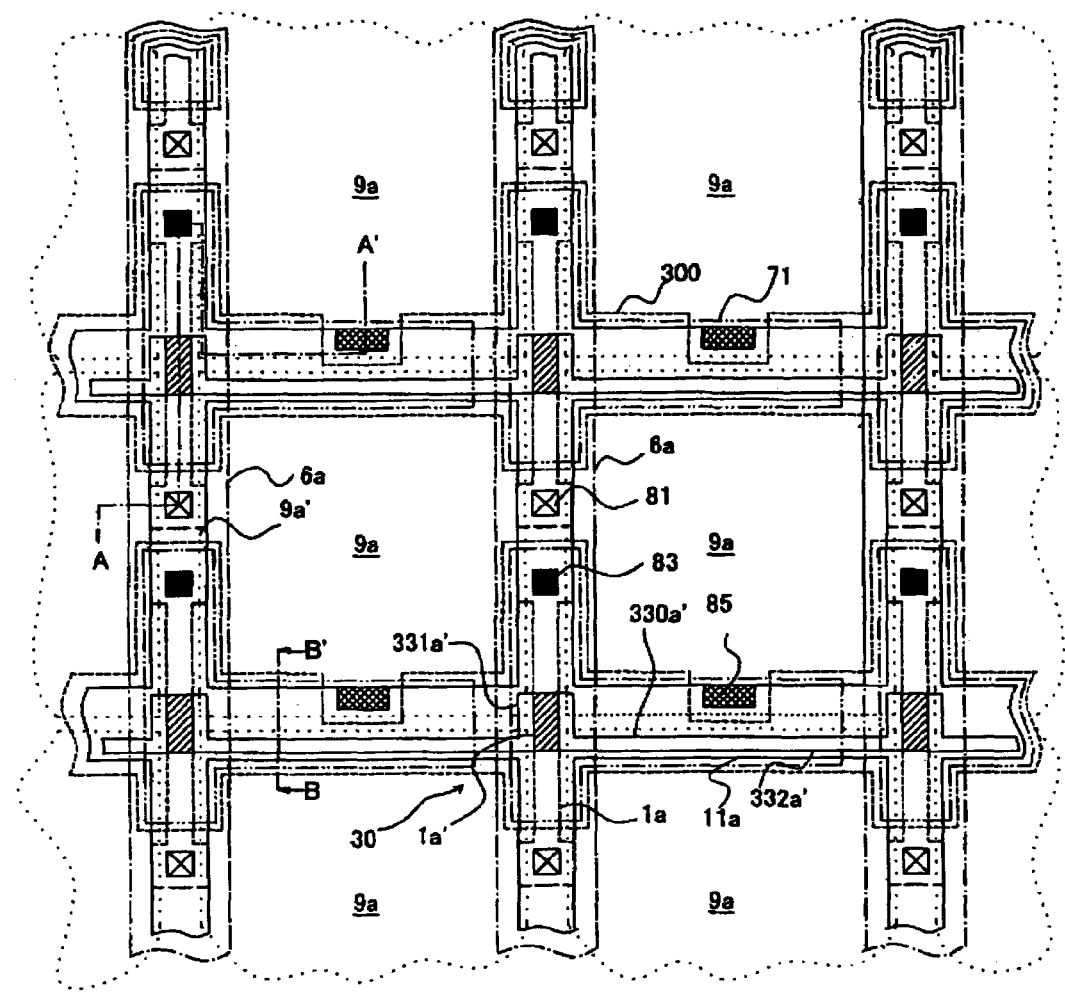
FIG. 5 is a plan view illustrating another exemplary embodiment in which the arrangement of the scanning lines and the TFTs is different from that in FIG. 2.

For example, the arrangement between the TFTs 30 and the scanning lines 330a in FIG. 2 described above shows an example of a suitable arrangement responsive to the requirement to effectively prevent or substantially prevent light from entering the channel areas 1a' of the TFTs 30. In addition, for example, the arrangements shown in FIGS. 5 and 6 can be implemented. FIG. 5 is a diagram with the same purpose as FIG. 2, in which an arrangement of the scanning lines and the TFTs is different from that in FIG. 2, and FIG. 6 illustrates only a shape pattern of the scanning lines shown in FIG. 5, similar to FIG. 4.

Figure 6:
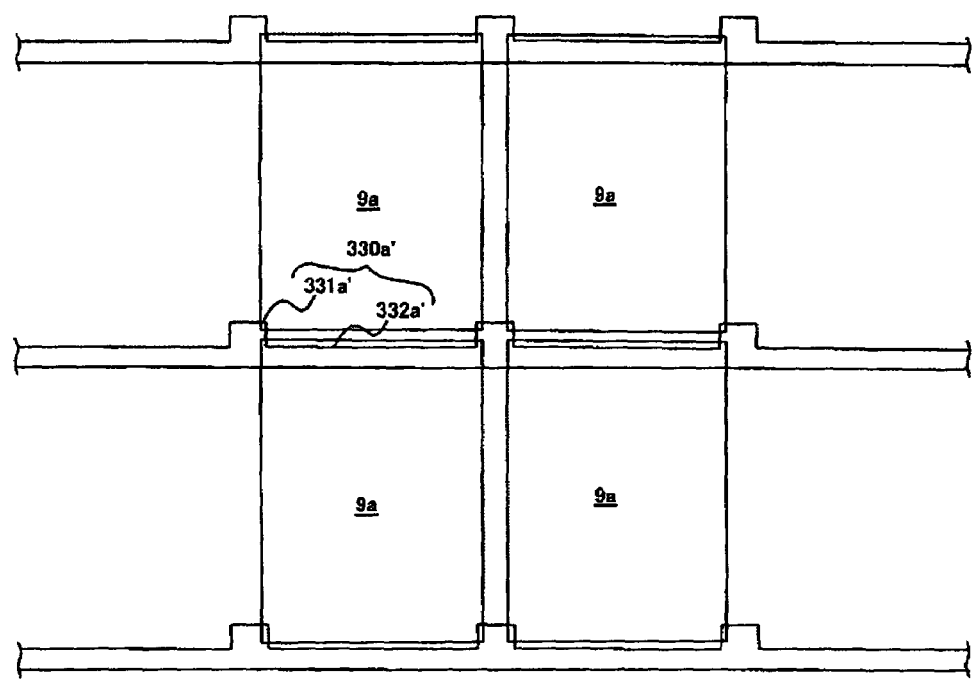
FIG. 6 is a plan view illustrating only a shape pattern of the scanning lines shown in FIG. 5.

In FIGS. 5 and 6, the scanning lines 330a', more specifically, the narrow width portions 332a' are formed at positions deviated from the center of a first long gap extending through a space between the adjacent pixel electrodes 9a sandwiching the scanning lines 330a' therebetween. Further, the broad width portions 331a' are formed to be protruded only upwardly in the Y direction in FIGS. 5 and 6. Furthermore, the arranged positions of the channel areas 1a', that is, the arranged positions of the broad width portion 331a' are similar to those in FIG. 2.

Figure 7:
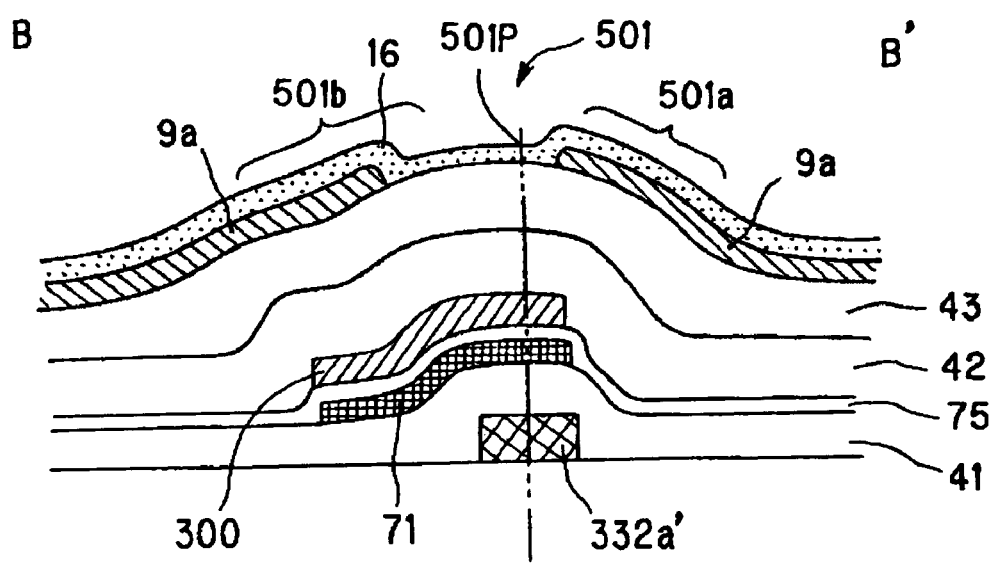
FIG. 7 is a sectional view taken along plane B-B' in FIG. 5.

This arrangement can enhance the quality of display image. The reason thereof is as follows. That is, in the electro-optical device according to the present invention, as described above, the oriented film 16 is provided on the pixel electrodes 9$a$, and on the surface of the oriented film 16, unevenness due to the "height" of various elements formed below the oriented film 16 can exist. The above-described "various elements" include the scanning lines 330$a'$ of the present exemplary embodiment. FIG. 7 is a sectional view taken along plane B-B' in FIG. 5, in which a convex portion 501 caused by the "height" of the narrow width portion 332$a'$ of the scanning line 330$a'$ is formed on the oriented film 16.

When the convex portion 501 is generated, there is a possibility of further generating nonuniformity in the above-described rubbing process performed on the oriented film 16. This nonuniformity may cause the bad orientation of the liquid crystal and thus the operation failure of the electro-optical device. Therefore, in the related art, by providing the light-shielding film in the vicinity of the above-described convex portion 501, shielding of the incident light is made possible. That is, the incident light reaching the light-shielding film is reflected or absorbed by the light-shielding film and thus does not contribute to the image display.

At this time, it is important that the above-described light-shielding film should be provided while satisfying the requirements to enhance the pixel opening ratio. That is, when the light-shielding film is provided only to correspond to the convex portion 501, it may unnecessarily worsen the pixel opening ratio to deteriorate the brightness of image. When the light-shielding film is provided only in a part of the convex portion 501, sufficient light-shielding cannot be accomplished and may cause the deterioration of the contrast ratio. In addition, the influence of the nonuniformity in the convex portion 501 may lead to the operation failure of the electro-optical device.

In the present exemplary embodiment, it has been paid attention to the fact that the nonuniformity are generated in the convex portion 501, more specifically, that the portion (hereinafter, "rubbing-up portion 501$a$" in FIG. 7) associated with rubbing up the convex portion 501 (that is, the direction ascending the convex portion 501) and the portion (hereinafter "rubbing-down portion 501$b$" in FIG. 7) associated with rubbing down the convex portion 501 (that is, the direction descending the convex portion 501), have nonuniformity different from each other.

More specifically, for example, it has been paid attention to the fact that it is more difficult to generate the nonuniformity in the rubbing-up portion 501$a$ than in the rubbing-down portion 501$b$, that is, the rubbing-down portion 501$b$ has the higher possibility of causing the bad orientation of the liquid crystal.

In the present exemplary embodiment, it is important that the narrow width portions 332$a'$ adjacent in the direction of the scanning lines 330$a'$ in FIG. 5 are formed at the position deviated from the center (see the two-dotted chain line in FIG. 7) between the pixel electrodes 9$a$. That is, by forming the narrow width portion 332$a'$ at the position shown in FIG. 7, a vertex 501P of the convex portion 501 caused by the narrow width portion 332$a'$ is also formed at the position deviated from the center between the adjacent pixel electrodes 9$a$. This means that it is possible to construct only almost half of the sloping surface of the convex portion 501 on the area corresponding to the first gap, that is, the rubbing-down portion 501$b$ on the area. Further, in this case, as shown in FIG. 7, by providing the light-shielding capacitive line 300 and the junction layer 71 corresponding to the space between the adjacent pixel electrodes 9$a$, it is possible to effectively shield only the rubbing-down portion 501$b$, that is, to effectively shield the corresponding portion of the convex portion 501 expected to be most influenced by the nonuniformity.

As a result, according to the present exemplary embodiment, since the operation failure of the electro-optical device caused by the nonuniformity can be substantially prevented, and since the rubbing-up portion 501$a$ of the convex portion 501 is not expected to be influenced by the nonuniformity remains to transmit the light contributing to the image display, it is possible to enhance the pixel opening ratio, that is, to maintain the bright image. Consequently, according to the present embodiment, from the above-described point of view, an enhancement in the quality of the display image can be obtained.

Further, by forming the narrow width portion 332$a'$ at the position deviated from the center of the first gap, it is possible to enhance the degree of freedom in the design of the electro-optical device and to effectively prevent or substantially prevent the light from entering the TFT 30. The reason thereof is as follows.

That is, although the narrow width portion 332$a'$ in the present exemplary embodiment extends through the first gap between the adjacent pixel electrodes 9$a$, it does not exist at the center thereof. For this reason, for example, by using an area not provided with the narrow width portion 332$a'$ in the first gap, other wirings such as the capacitive line 300 made of the same film as the narrow width portion 332$a'$ can be formed parallel to the narrow width portion 332$a'$ from a plan view. That is, the degree of freedom in design can be increased.

Further, in the above-described case, although the narrow width portion 332$a'$ is deviated from the center line, by adjusting the width of the broad width portion 331$a'$, for example, by broadening only one side thereof or by broadening one side thereof more than the other side, it is possible to arrange the broad width portion 331$a'$ as the gate electrode at the center of the gap. In the present exemplary embodiment, as shown in FIGS. 5 and 6, it can be understood that the broad width portion 331$a'$ is broadened toward only one side. Hence, since the gate electrode can be arranged at a position advantageous to enhance the light-shielding ability irregardless of the position of the scanning line 330$a'$, or since the scanning line 330$a'$ can be arranged at an arbitrary position in the gap while arranging the gate electrode at a position advantageous for improving the light-shielding ability, it is possible to increase the degree of freedom in an arrangement of wirings, such as an arrangement of the scanning line 330$a'$ and to obtain the TFT 30 originally having a substantially high light-shielding ability.

In short, in the embodiment shown in FIGS. 5 and 6, while satisfying the requirements to enhance the quality of the display image, enhancing the degree of freedom in design and decreasing the light leak current in the TFT 30, it is possible to adequately adjust/determine the arrangement between the channel area 1$a'$ (or the TFT 30) and the gate electrode (or the scanning line 330).

As described above, according to the electro-optical device of the present exemplary embodiment, since the scanning line, as the gate electrode, has the broad width portion and the narrow width portion, while satisfying the above various requirements or a general requirement, such as high precision of the electro-optical device itself, it is possible to adequately adjust/determine the arrangement between the channel area (or the TFT) and the gate electrode (or the scanning line).

Second Exemplary Embodiment

Figure 8:
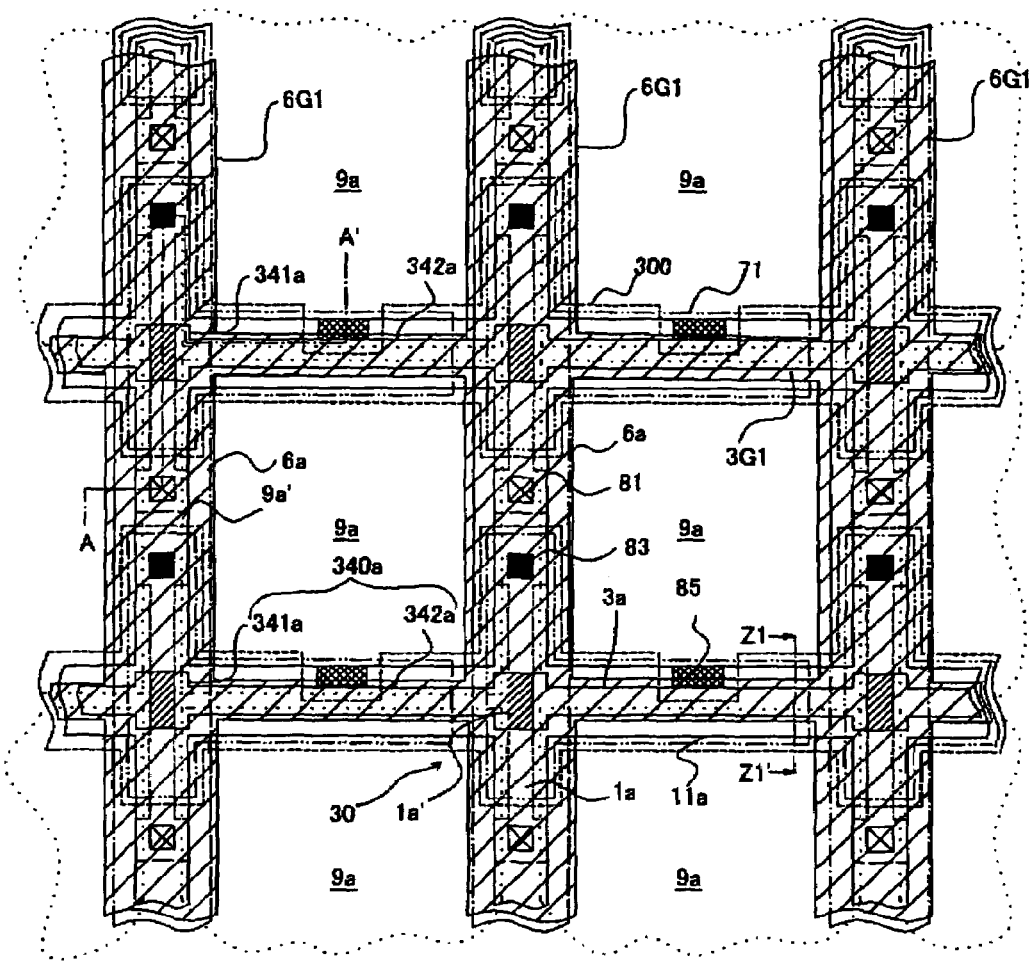
FIG. 8 is a plan view illustrating another exemplary embodiment different from that in FIG. 2 in that grooves are formed on the TFT array substrate and the scanning lines are buried in the grooves.
Figure 9:
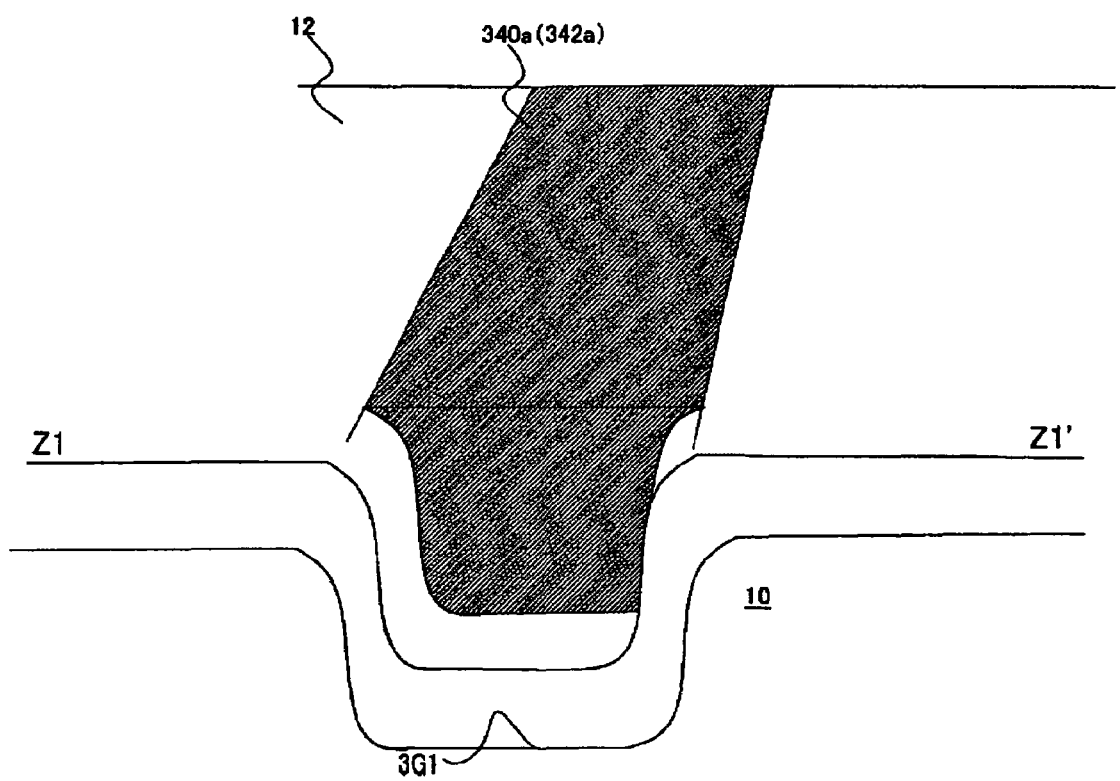
FIG. 9 is a sectional view illustrating a profile of a narrow width portion of the scanning lines shown in FIG. 8.
Figure 10:
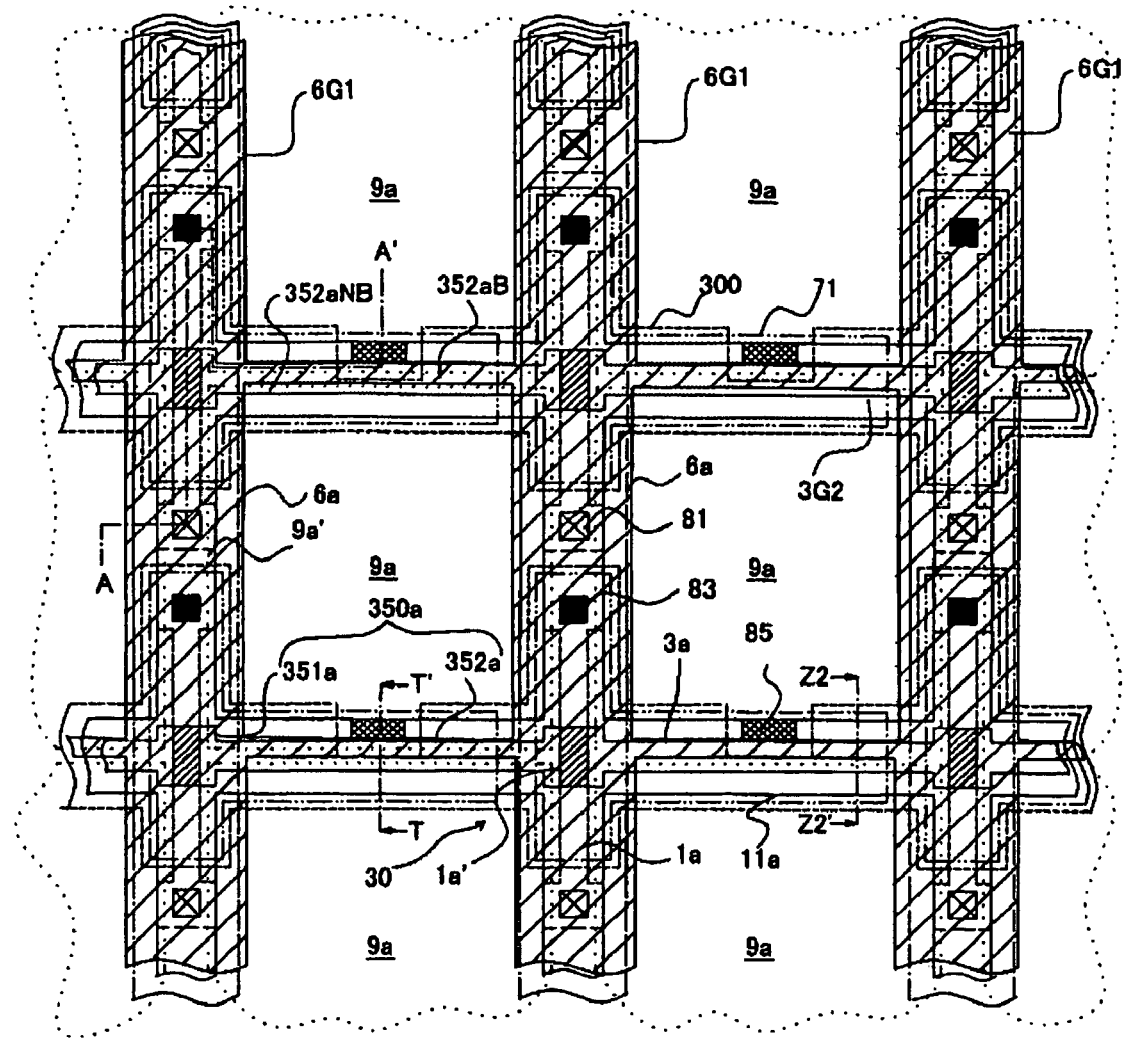
FIG. 10 is a plan view illustrating another exemplary embodiment different from that in FIG. 2 in that grooves are formed on the TFT array substrate and a part of the scanning lines are buried in the grooves.
Figure 10:
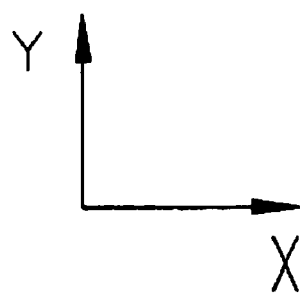
Figure 11:
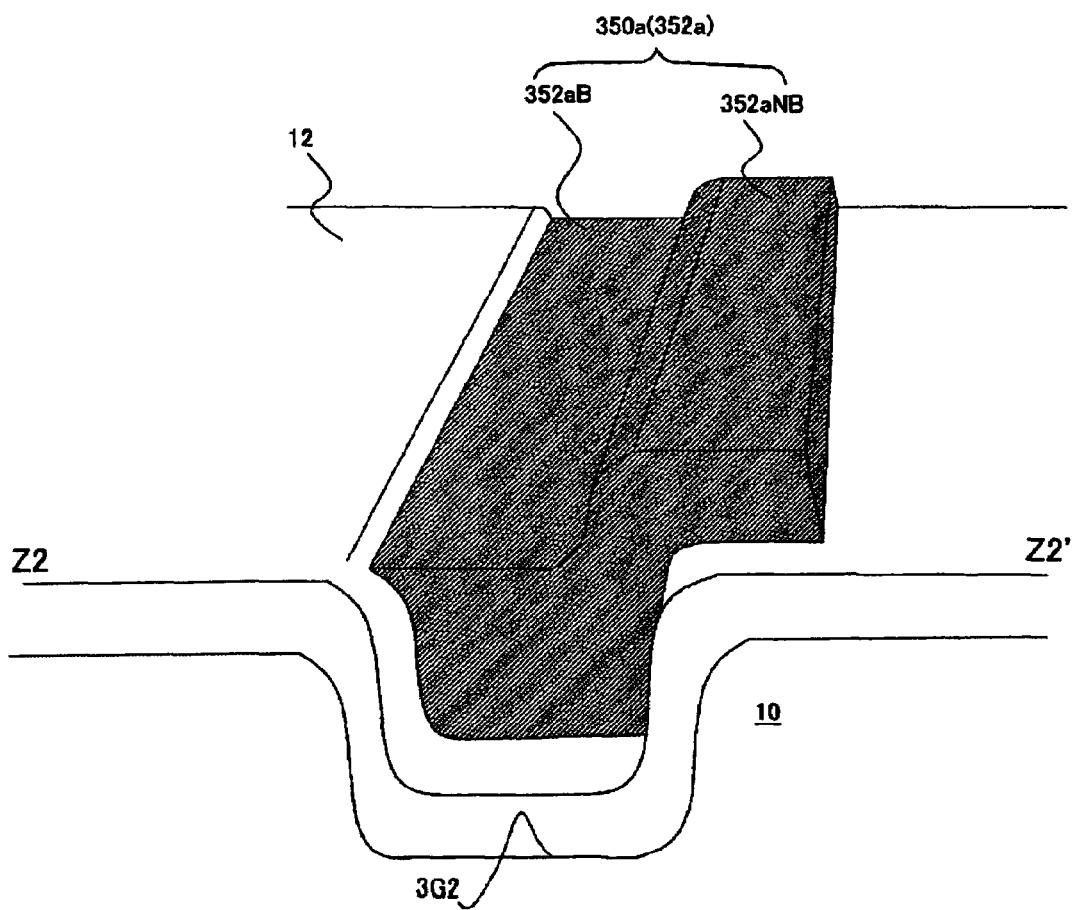
FIG. 11 is a sectional view illustrating a profile of a narrow width portion of the scanning line shown in FIG. 10.
Figure 12:
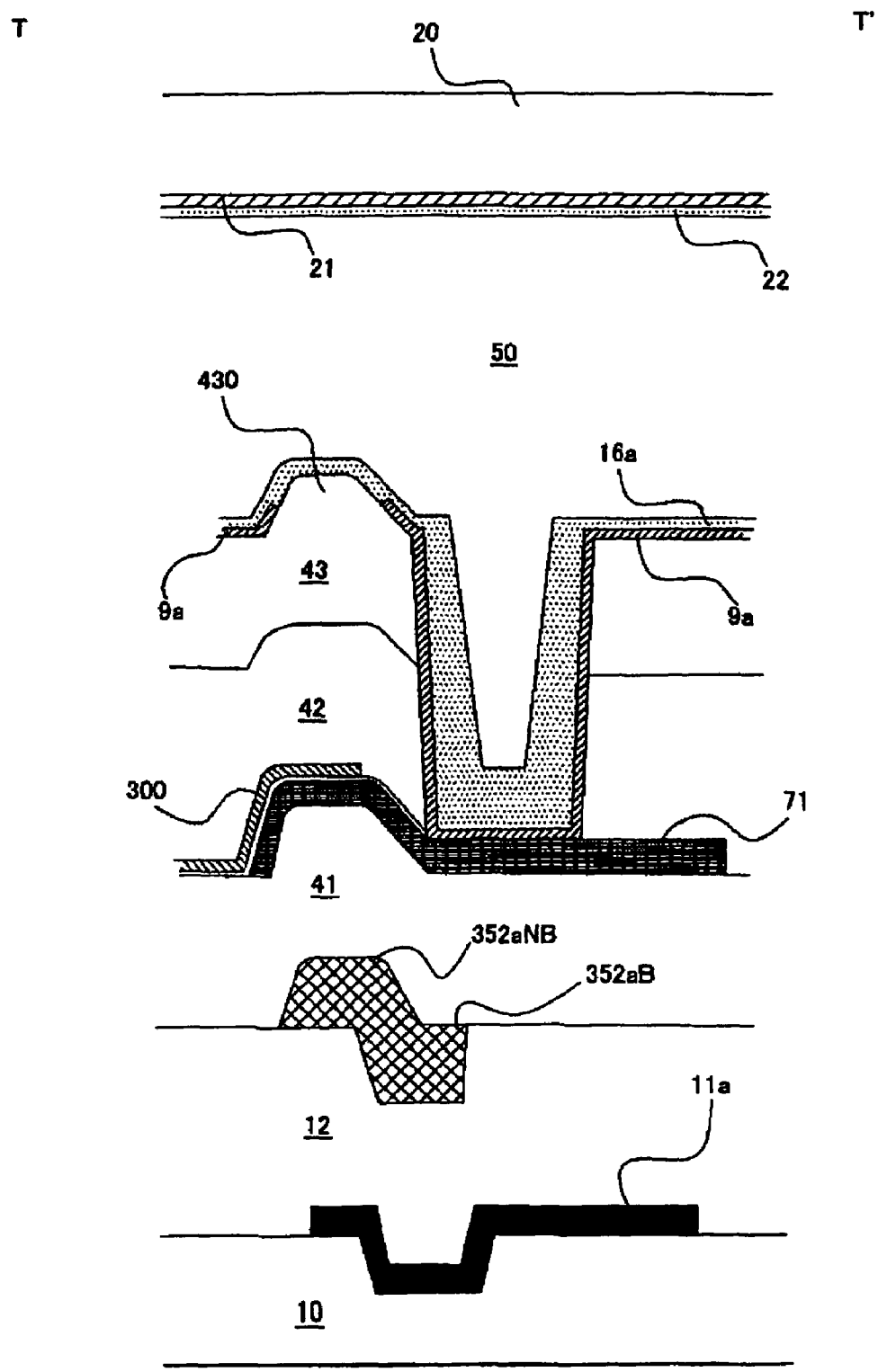
FIG. 12 is a sectional view taken along plane T-T' in FIG. 10.

Now, a second exemplary embodiment of the present invention is explained with reference to FIGS. 8 to 11. FIGS. 8 and 10 are plan views illustrating another exemplary embodiment different from that in FIG. 2 in that a groove is formed on the TFT array substrate 10 and at least a part of the scanning line is buried in the groove. FIGS. 9 and 11 are sectional views illustrating a profile of the narrow width portion of the scanning line according to the second exemplary embodiment, respectively (FIG. 9 corresponds to FIG. 8, and a section taken along a line Z1-Z1' in FIG. 8 corresponds to a section taken along plane Z1-Z1' in FIG. 9. Further, FIG. 11 corresponds to FIG. 10, and a section taken along plane Z2-Z2' in FIG. 10 corresponds to a section taken along plane Z2-Z2' in FIG. 9). Further, FIG. 12 is a sectional view taken along plane T-T' in FIG. 10. Furthermore, since the basic construction and operation, etc., of the electro-optical device of the second exemplary embodiment are similar to those of the first exemplary embodiment, explanation about distinctive portions in the second exemplary embodiment are mainly described below. Furthermore, the reference numerals in FIGS. 8 and 12 indicate the same elements as in FIGS. 1 to 7 referred to in the above description, when they indicate substantially equivalent elements.

First, in one aspect of the second exemplary embodiment, as shown in FIGS. 8 and 9, a groove 3G1 is formed along the scanning line in the TFT array substrate 10. The groove 3G1 is formed except for the area where the semiconductor layer 1a of the TFT 30 is formed. By this construction, in consideration of only the grooves, the grooves 3G1 are arranged in a matrix shape from a plan view (see FIG. 8). Further, a scanning line 340a is formed such that the narrow width portion 342a thereof is entirely buried in the groove 3G1 (see FIG. 9).

In another aspect of the second embodiment, as shown in FIGS. 10 and 11, a groove 3G2 is formed on the TFT array substrate 10, similarly to the groove 3G1. However, preferably, a groove 3G2 is formed slightly narrower than the groove 3G1. Further, a narrow width portion 352a of the scanning line 350a is formed along the groove 3G2. The narrow width portion 352a has a buried portion 352aB of which a part is buried in the groove 3G2 and a non-buried portion 352aNB which is not buried in the groove 3G2 and extends parallel to the buried portion 352aB. The non-buried portion 352aB is formed on the surface of the TFT array substrate 10.

Further, in one aspect and another aspect of the second exemplary embodiment, as shown in FIGS. 8 and 10, a groove 6G1 is formed in the TFT array substrate 10 along the data line. Furthermore, the data line 6a is formed to be entirely buried in the groove 6G1. In addition, the semiconductor layer 1a is also formed to be entirely buried in the groove 6G1.

According to the electro-optical device of the second exemplary embodiment constructed as above, the following effects can be obtained. First, since the whole part or a part of both of the scanning lines 340a and 350a are buried in the grooves 3G1 or 3G2, as shown in FIGS. 9 and 11, in this buried portion, the surface height of the base insulating film 12 and the height of the buried portion 352aB of the scanning line 340a and the scanning line 350a are almost equal to each other to maintain the leveling feature. By this, the leveling feature of the first to third interlayer insulating film 41 to 43 formed as the upper layers of the scanning lines 340a and 350a, or the pixel electrode 9a and the oriented film 16 can be well obtained. Therefore, in the second exemplary embodiment, for example, since a step along the narrow width portion 342a or the buried portion 352aB does not substantially appear on the surface of the oriented film 16, the rubbing process can be very suitably performed on the oriented film 16 and the bad orientation can be drastically prevented or reduced. Furthermore, an effect can be obtained that the light leakage caused by the bad orientation and deterioration of the image quality based on the light leakage.

Such effects on the portion along the data line 6a can be obtained because of the existence of the groove 6G1.

Further, in FIGS. 10 and 11, in particular, because of the existence of the non-buried portion 352aNB, the following effects can be obtained. The effects are explained in detail below.

First, in the electro-optical device of the present exemplary embodiment, generally in order to prevent or reduce deterioration of the electro-optical material caused by the application of DC voltage and to prevent or reduce the cross-talk or flicker in the displayed image, an inverse driving method of inversing the polarities of voltages applied to the respective pixel electrodes 9a in a predetermined rule may be employed. More specifically, so-called "1H inverse driving method" is explained below.

Figure 13:
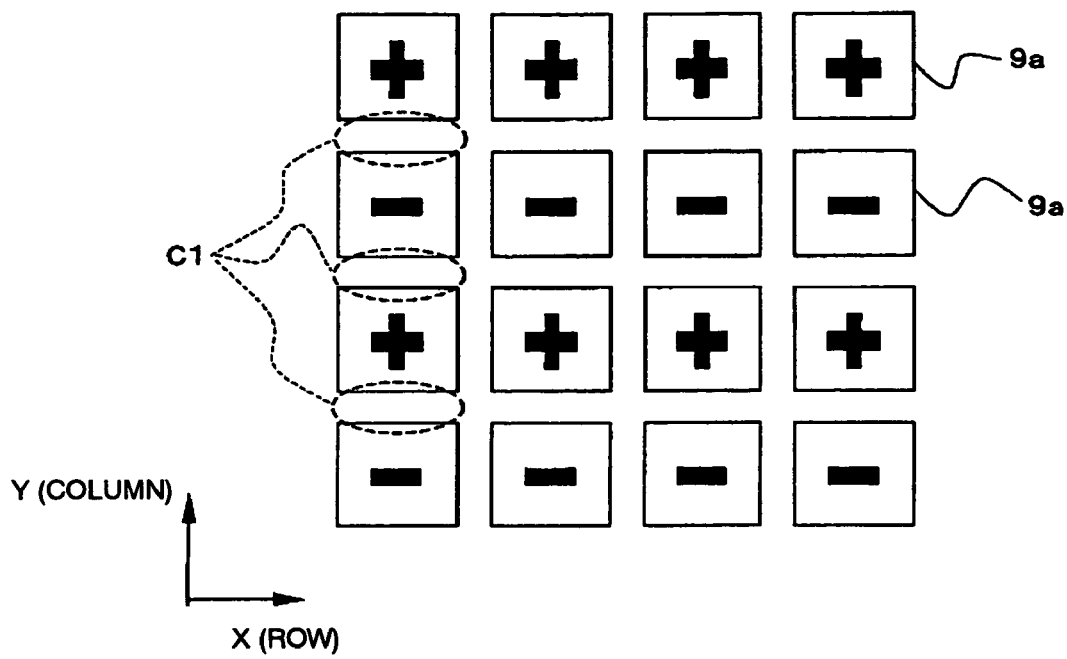
FIGS. 13(a) and 13(b) are schematics explaining the generation of a horizontal electric field.
Figure 13:
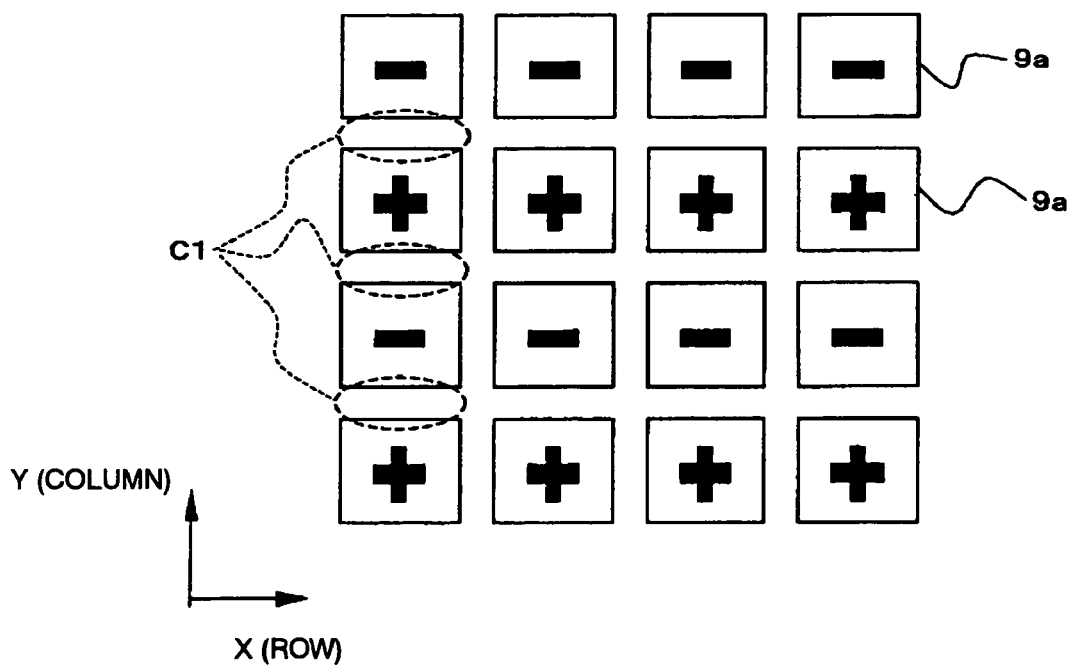

First, as shown in FIG. 13(a), during the time to display image signals for the n-th field (n is a natural number) or frame, the polarity of the liquid crystal driving voltage indicated by + or − for each pixel electrode 9a is driven with the same polarity for every row. Thereafter, as shown in FIG. 13(b), when the image signals for the n+1-th field or frame are displayed, the polarity of the liquid crystal driving voltage for each pixel electrode 9a is inversed and during the time for displaying the image signal of the n+1th field or one frame, the polarity of the liquid crystal driving voltage indicated by + or − for each pixel electrode 9a is not inversed, and each pixel electrode is driven with the same polarity for every row. Then, the state shown in FIGS. 13(a) and 13(b) is repeated at the period of one field or one frame. This is the 1H inverse driving method. As a result, while avoiding deterioration of the liquid crystal caused by the application of DC voltage, it is possible to prevent image display with reduced cross-talk or flicker. Further, the 1H inverse driving method is more advantageous than the 1S inverse driving method to be explained later, in that there is no almost cross-talk in the vertical direction (Y direction) in the drawing.

However, as can be understood from FIG. 13(a) and FIG. 13(b), in the 1H inverse driving method, a horizontal electric field takes place between the pixel electrodes 9a adjacent to each other in the vertical direction (Y direction) in the drawing. In these drawings, an area C1 where the horizontal electric field takes place is always in the vicinity of the gap between the pixel electrodes adjacent to each other in the Y direction. If such horizontal electric field is applied, for the electro-optical material to which a vertical electric field, i.e., an electric field perpendicular to the surface of the substrate, is applied, between the pixel electrode and the opposing electrode facing each other, the operation failure can be caused by the bad orientation of the liquid crystal in the electro-optical material and by the light leakage in the portion, which leads to a problem of decreasing the contrast ratio.

With respect to the above, the area where the horizontal electric field is generated can be covered by the light-shielding film. However, in this case, there is a problem that the opening area of pixels becomes narrow in respect to the area where the horizontal electric field is generated. In particular, as the distance between the adjacent pixel electrodes becomes small due to minuteness of the pixel pitch, such horizontal electric field increases, and thus this poses a serious problem in a higher precision electro-optical device.

In the aspect shown in FIGS. 10 and 11 of the second exemplary embodiment, a step caused by the height of the non-buried portion 352aNB is formed between the pixel electrodes 9a (that is, the adjacent pixel electrodes 9a to which voltage of inverse polarity is applied) adjacent to each other in the vertical direction. Because of the existence of this step, it is possible to intensify the vertical electric field in the vicinity of an edge portion of the pixel electrode 9a arranged on the step and to weaken the horizontal electric field. More specifically, as shown in FIG. 12, the distance between the vicinity of the edge portion of the pixel electrode 9a arranged on the step 430 and the opposing electrode 21 becomes narrower by the height of the step 430. Therefore, in the area C1 where the horizontal electric field is generated, the vertical electric field between the pixel electrode 9a and the opposing electrode 21 can be intensified. Furthermore, in FIG. 12, since the gap between the adjacent pixel electrodes 9a is constant, the intensity of the horizontal electric field to be intensified with the gap getting narrow is constant. Therefore, by making the vertical electric field more prevalent in the area C1 where the horizontal electric field is generated, it is possible to prevent or reduce the bad orientation of the liquid crystal caused by the horizontal electric field. Furthermore, because of the step 430 made of the insulating film, the intensity of the horizontal electric field is weakened, and the portion of the liquid crystal affected by the horizontal electric field is decreased by the amount of replacing the step where the horizontal electric field exists. Therefore, the influence of the horizontal electric field on the liquid crystal layer 50 can be reduced.

Further, in the above description, the 1H inverse driving method has been explained but the present invention is not limited to such a driving method. For example, 1S inverse driving method of inversing the voltage polarity at a period of a frame or a field for each column while driving pixel electrodes in a column with the potential of the same voltage polarity may be employed in the present invention as the inverse driving method of which control is relatively easy and which enables the high quality image display. Furthermore, between the pixel electrodes adjacent to each other in both of the column direction and the row direction, the dot inverse driving method of inversing the voltage polarity applied to each pixel electrode has been developed and can be applied to the present invention.

Figure 14:
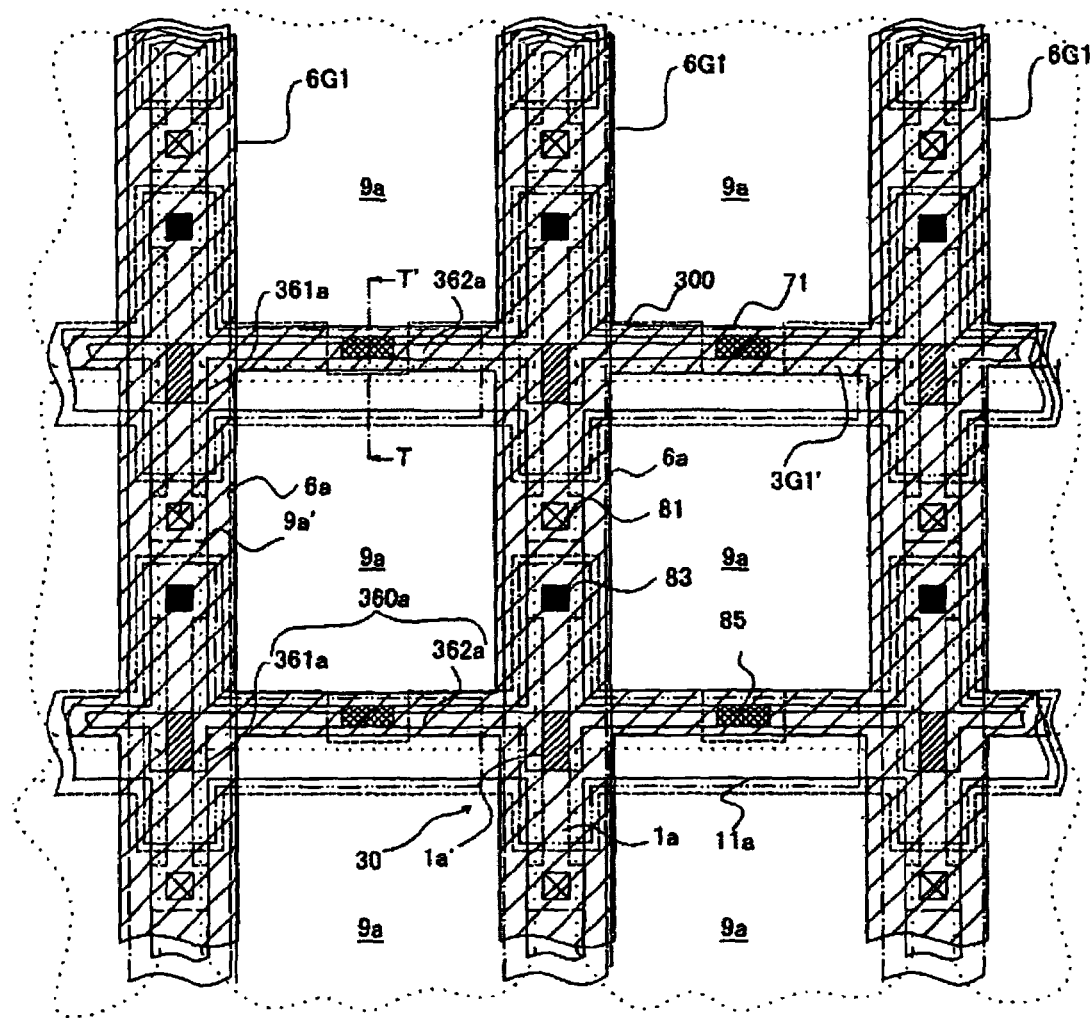
FIG. 14 is a plan view illustrating another exemplary embodiment different from that in FIG. 2 in that grooves are formed on the TFT array substrate and the narrow width portion of the scanning line is deviated from the center of a first gap.

Further, in the second exemplary embodiment, as shown in FIG. 2, the aspect in which the narrow width portion 342a and 352a is formed to extend through the center of the first gap between the adjacent pixel electrodes 9a has been explained. However, the present invention is not limited to such a construction. That is, as shown in FIGS. 5 and 6, in the aspect where the narrow width portion is formed to extend at the position deviated from the center of the first gap, the grooves 3G1 or 3G2 shown in FIGS. 8 to 11 may be formed in a combination. For example, the construction shown in FIGS. 14 and 15 may be employed. FIG. 14 is a plan view illustrating another aspect different from that in FIG. 2 in that a groove is formed on the TFT array substrate 10, and the narrow width portion of the scanning line is deviated from the center of the first gap, and FIG. 15 is a sectional view taken along plane T-T' in FIG. 14.

FIG. 14 is similar to FIGS. 5 and 6 in that a narrow width portion 362a of a scanning line 360a is deviated from the center of the long first gap extending through the space between the adjacent pixel electrodes 9a, but FIG. 14 is different from FIGS. 5 and 6 in that the narrow width portion 362a is formed along a groove 3G1' formed on the TFT array substrate 10 and a broad width portion 361a is formed to protrude only downwardly in FIG. 14. In this construction, the narrow width portion 362a of the scanning line 360a is formed from the upper portion in the drawing as viewed from the center of the first gap, and thus the narrow width portion 362a is formed to be positioned right below the contact hole 85 for connecting the pixel electrode 9a and the junction layer 71. Further, the narrow width portion 362a is formed to be entirely buried in the groove 3G1'.

Figure 15:
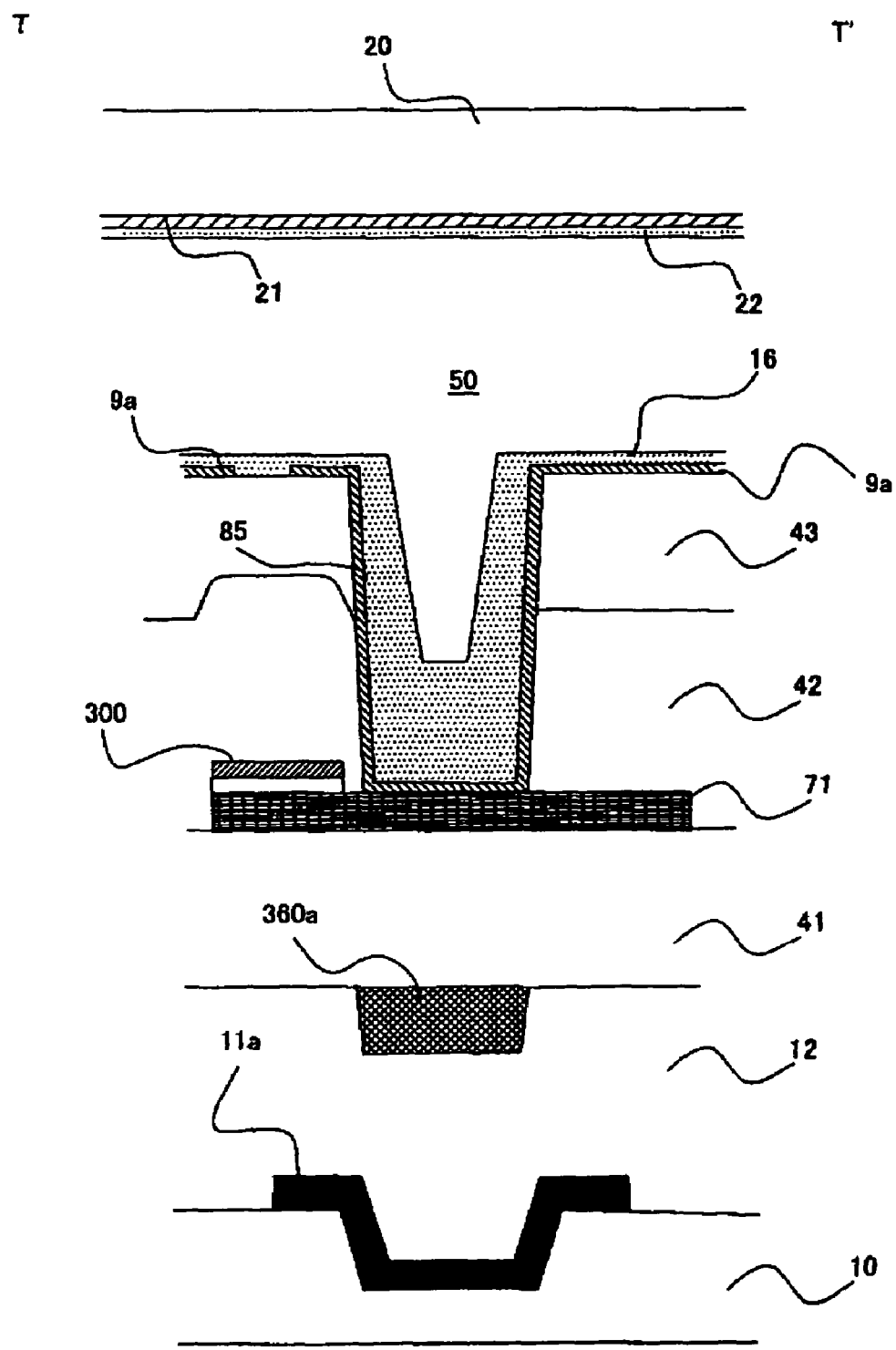
FIG. 15 is a sectional view taken along plane T-T' in FIG. 14.

According to this construction, as shown in FIG. 15, the contact hole 85 is formed on the scanning line 360a formed to be buried in the groove 3G1'. In other words, it is possible to form the contact hole 85 on the assumption that the step caused by the height of the scanning line 360a does not substantially appear on the surface of the third interlayer insulating film 43.

In such a construction shown in FIGS. 14 and 15, in particular, an advantage from the contact hole 85 which can be easily and securely formed can be obtained. That is, assuming that a step due to the height of the scanning line or the narrow width portion is generated on the surface of the third interlayer insulating film 43, there is a possibility of a disadvantage in that the contact hole 85 may be formed on the vertex or on the ridge of the step. The present construction overcomes such a drawback.

The above effects can be understood from the following point of view. That is, in the second exemplary embodiment, since the whole or a part of the scanning line is buried in the groove, and thus a step due to the height of the scanning line does not substantially appear on the surface of the respective interlayer insulating film, the formation position or the extending position of the scanning line need not be considered particularly. In other words, if the scanning line is between the adjacent pixel electrodes in the direction thereof, the scanning line may be formed at any position. This is because, even when the formation position or extending position of the scanning line is selected freely and the contact hole is formed thereon, as described above, the contact hole can be relatively easily and securely formed due to the absence of the step.

Further, in case the narrow width portion has both the buried portion and the non-buried portion, it is preferable to form the groove such that the buried portion is positioned right below the contact hole 85. FIG. 12 corresponds to an example of such a construction.

Third Exemplary Embodiment

Figure 16:
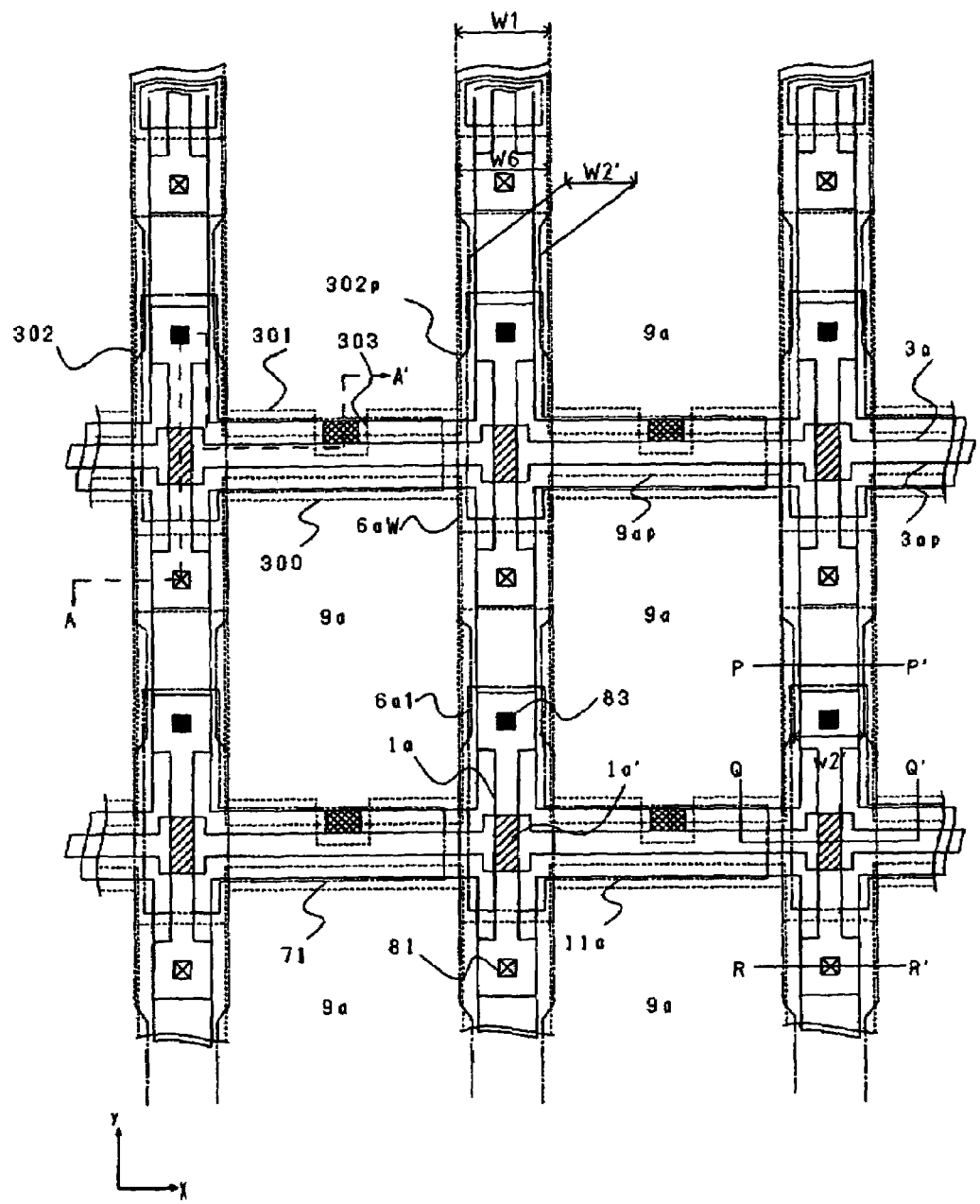
FIG. 16 is a plan view illustrating another exemplary embodiment in that a shape of the data line is different from that in FIG. 2.
Figure 17:
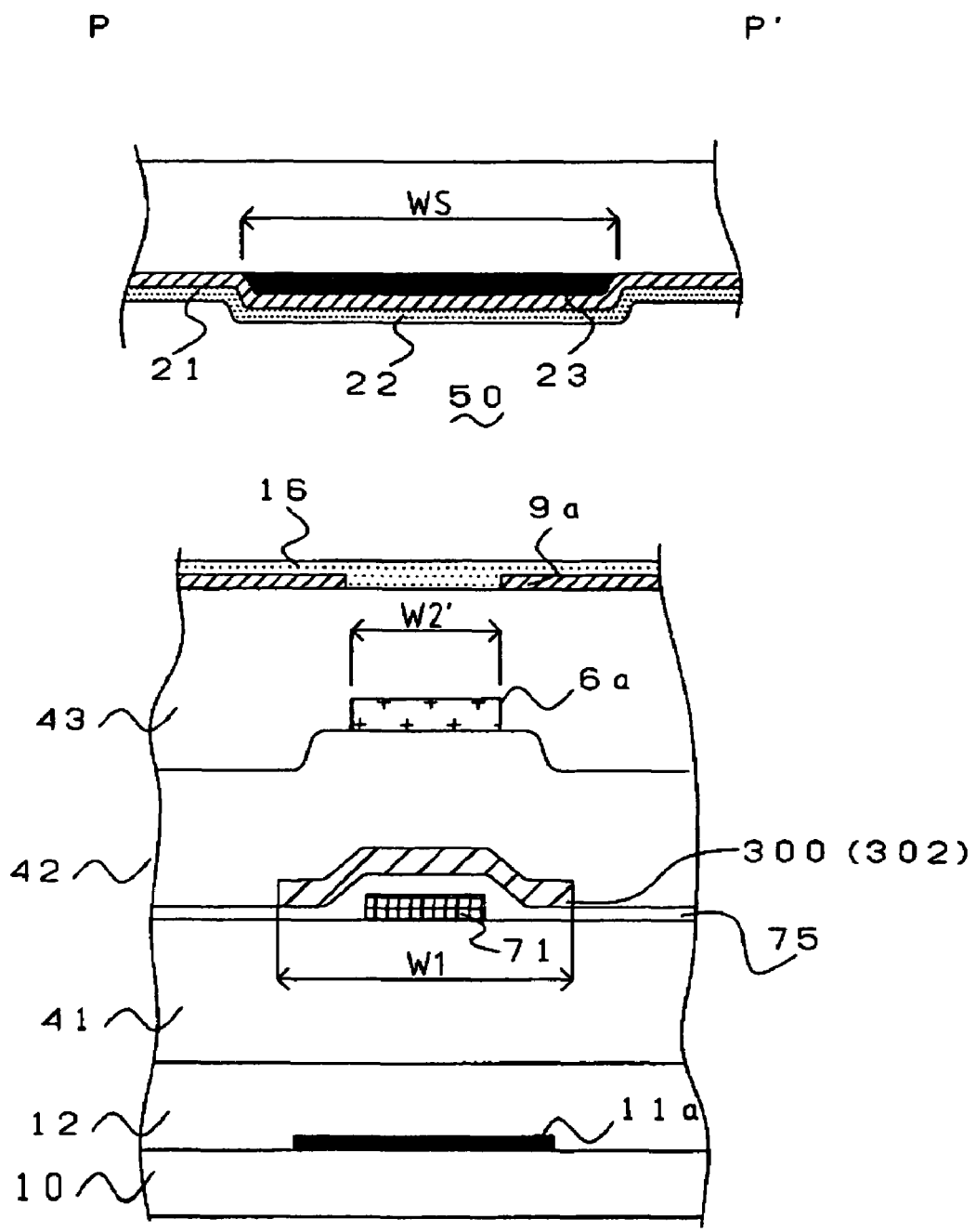
FIG. 17 is a sectional view taken along plane P-P' in FIG. 16.
Figure 18:
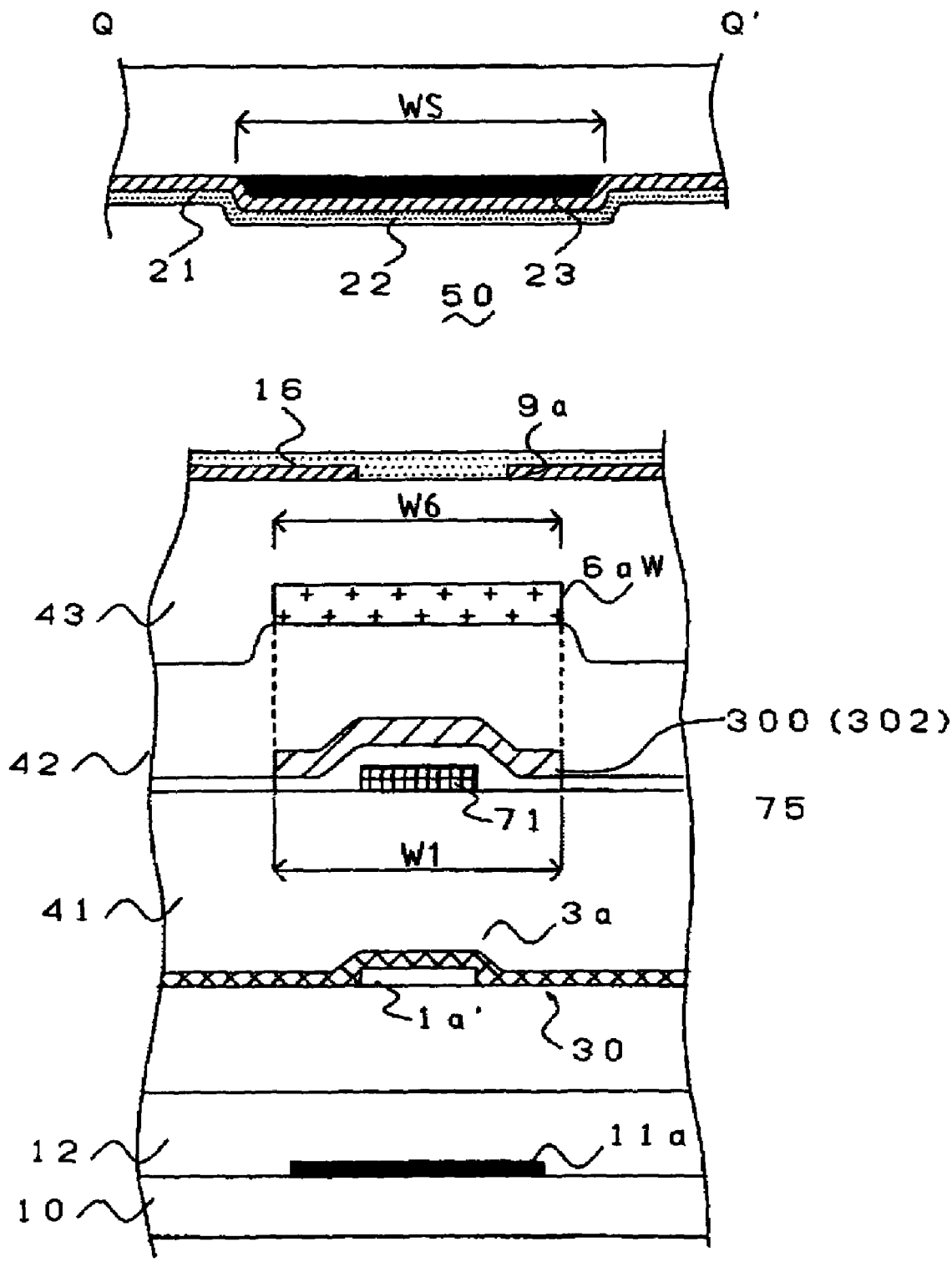
FIG. 18 is a sectional view taken along plane Q-Q' in FIG. 16.
Figure 19:
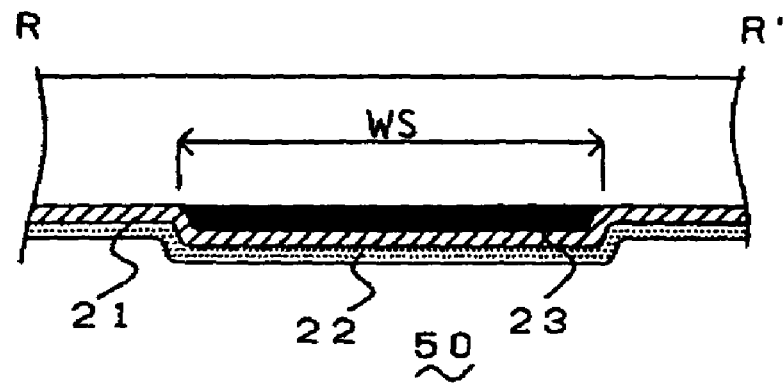
FIG. 19 is a sectional view taken along plane R-R' in FIG. 16.
Figure 19:
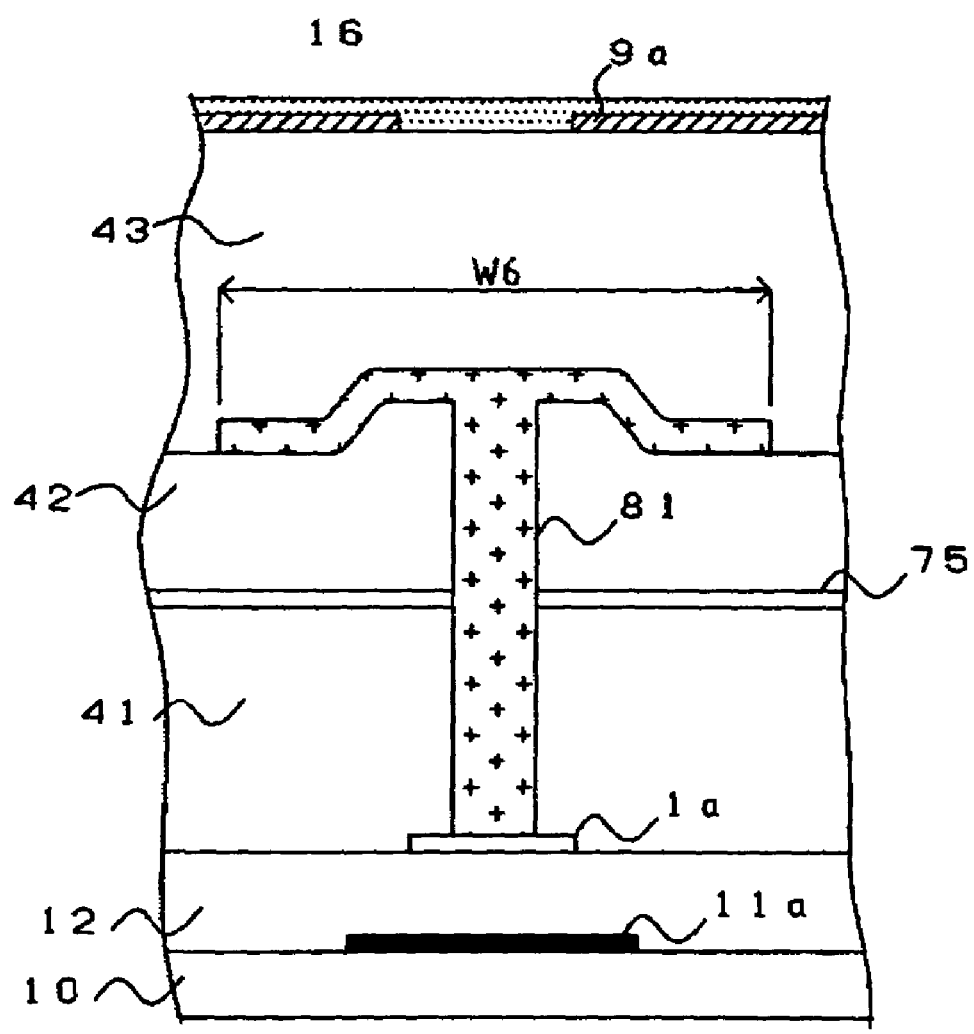

A third exemplary embodiment of the present invention is explained below with reference to FIGS. 16 to 19. FIG. 16 is a plan view illustrating another aspect in that a shape of the data line is different from that in FIG. 2. FIG. 17 is a sectional view taken along plane P-P' in FIG. 16, FIG. 18 is a sectional view taken along plane Q-Q' in FIG. 16, and FIG. 19 is a sectional view taken along plane R-R' in FIG. 16. Further, since the basic construction and operation of the electro-optical device of the third exemplary embodiment are similar to those of the first exemplary embodiment, explanation about distinguishing features of the third exemplary embodiment is mainly described below. Furthermore, reference numerals in FIGS. 16 to 19 indicate the same elements as in FIGS. 1 to 15 referred to in the above description, when they indicates substantially equivalent elements.

In the third exemplary embodiment, as shown in FIGS. 16 to 19, a data line 6a1 includes a broad width portion 6aW of which a portion overlapping the TFT 30 is formed locally broad. Further, a width W1 of a portion extending along the data line 6a1 in the capacitive line 300, that is, the protruded portion 302, first, is broader than a width W2' of the portions except for the broad width portion 6aW in the data line 6a1 (in particular, see FIG. 17). Second, the width W1 of the protruded portion 302 is almost equal to a width W6 of the broad width portion 6aW in the data line 6a1 (see FIG. 18). The channel area 1a' of the semiconductor layer 1a is positioned almost at the center in the width direction of the broad width direction 6aW and almost at the center in the width direction of the scanning line 3a. Furthermore, in the third exemplary embodiment, as shown in FIGS. 16, 18 and 19, the broad width portion 6aW of the data line 6a1 is formed continuously from the portion overlapping the TFT 30 to the portion in which the contact hole 81 to connect the semiconductor layer 1a of the TFT and the data line 6a is provided, for each TFT 30 arranged in a matrix shape. In addition, in the third exemplary embodiment, as shown in FIGS. 17 to 19, the light-shielding film 23 is formed on the opposing substrate 20. A width WS of one-by-one lattice of the light-shielding film 23 is greater than that of the broad width portion 6aW.

In the electro-optical device of the third exemplary embodiment constructed like the above, the following effects can be obtained. That is, first, since the broad width portion 6aW of the data line 6a1 and the protruded portion 302 of the capacitive line 300 which is formed broad exist on the TFT 30, so called a double light-shielding effect can be obtained. Therefore, it is difficult for the light to enter the channel area 1a' of the TFT 30, and thus the light leak current can be reduced or minimized.

In particular, in the third exemplary embodiment, the broad width portion 6aW of the data line 6a also exists on the TFT 30 while overlapping the capacitive line 300. In this case, on the TFT 30, the light-shielding ability corresponding to the integrated value of their transmittances can be obtained. Further, since the channel area 1a' of the semiconductor layer 1a is positioned almost at the center in the width direction of the broad width portion 6aW and almost at the center in the width direction of the scanning line 3a, the light-shielding ability can be enhanced.

Second, in connection with such excellent light-shielding ability, in the third exemplary embodiment, as described above, the width W1 of the protruded portion 302 of the capacitive line 300 and the width W6 of the broad width portion 6aW of the data line 6a are less than the width WS of the light-shielding film 23 on the opposing substrate 20 (that is, WS>W1, WS>W6). According to this, the light entered from the upper portion of the TFT 30 is first shielded by the light-shielding film 23 and is further shielded by the broad width portion 6aW of the data line 6a. Furthermore, although passing through the broad width portion 6aW, the incident light is next shielded by the protruded portion 302 of the capacitive line 300. In short, in the third exemplary embodiment, since triple light-shielding is implemented, it becomes more difficult for the light to enter the TFT 30.

Third, in the third exemplary embodiment, the broad width portion 6aW of the data line 6a is formed continuously from the portion overlapping the TFT 30 to the contact hole 81 for each TFT 30 arranged in a matrix shape. Since the contact hole 81 is provided to connect the semiconductor layer 1a of the TFT 30 and the data line 6a as described above, the capacitive line 300 cannot be formed in the portion. However, in the third exemplary embodiment, in the formation position of the contact hole 81, the broad width portion 6aW of the data line 6a exists similarly to the upper portion of the TFT 30. Therefore, deterioration of the light-shielding ability caused by the absence of the capacitive line 300 can be compensated by the existence of the broad width portion 6aW. In this connection, as in the third exemplary embodiment, according to the aspect that the broad width portion 6a is formed continuously on the TFT 30 and on the formation position of the contact hole 81, since it is not necessary to broaden exceedingly the formation area of the broad width portion 6aW, it is preferable not to increase the inner reflection.

As described above, in the third exemplary embodiment, by the combination of various effects, the possibility of the light incidence to the channel area 1a' is drastically decreased, and the generation of the light leak current in the TFT 30 and consequently the generation of the flicker and the like on the image due to the light leak current can be effectively suppressed, reduced or minimized.

(The Whole Construction of the Electro-Optical Device)

The whole construction of the electro-optical device according to the present exemplary embodiment constructed like the above is explained with reference to FIGS. 20 and 21. Further, FIG. 20 is a plan view of the TFT array substrate along with the respective elements formed thereon viewed from the opposing substrate 20 side, and FIG. 21 is a sectional view taken along plane H-H' in FIG. 20.

Figure 20:
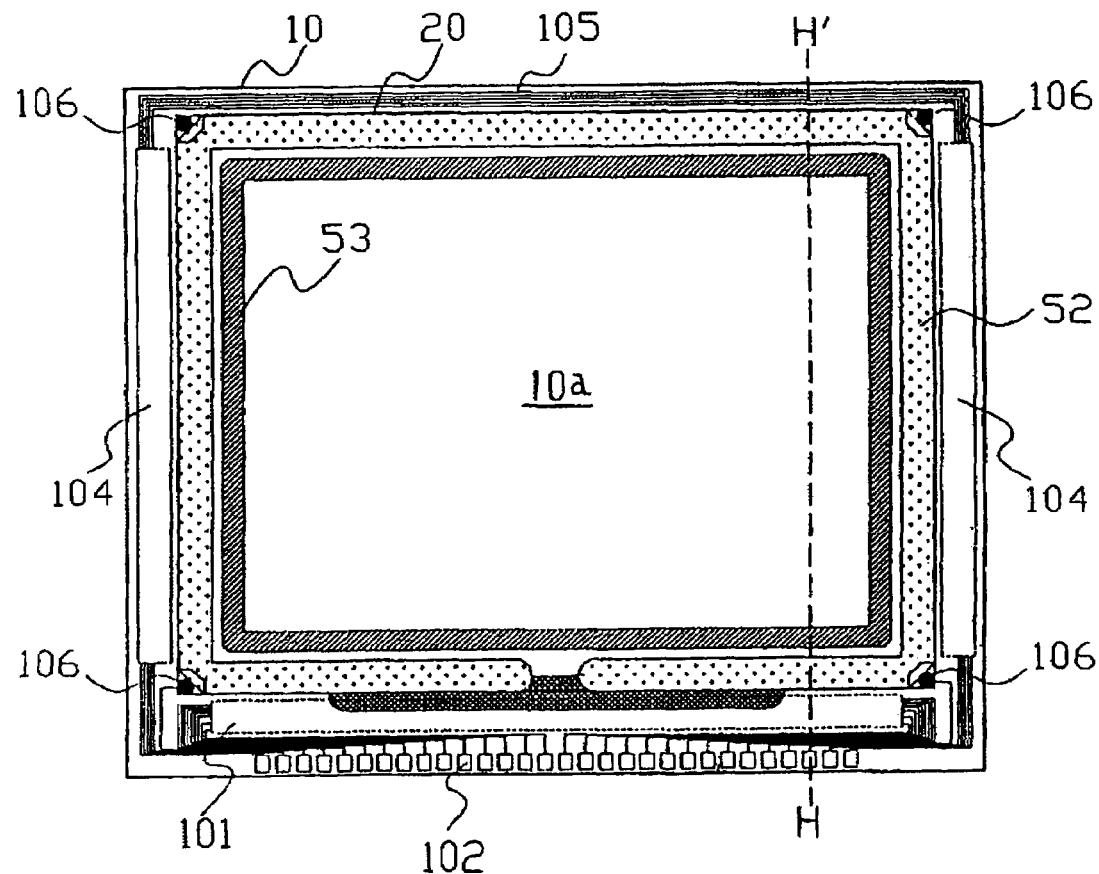
FIG. 20 is a plan view where the TFT array substrate of the electro-optical device according to the exemplary embodiment of the present invention is viewed from the opposing substrate side along with the respective elements formed thereon.
Figure 21:
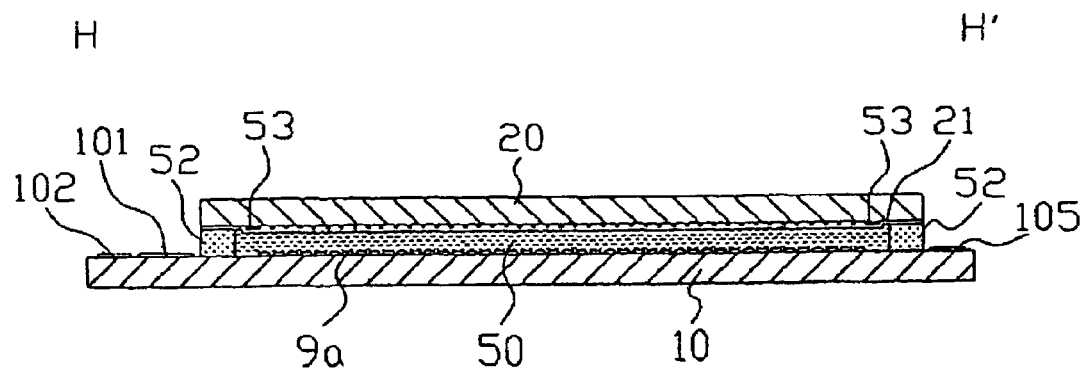
FIG. 21 is a sectional view taken along plane H-H' in FIG. 20.

In FIGS. 20 and 21, in the electro-optical device according to the present exemplary embodiment, the TFT array substrate 10 and the opposing substrate 20 are arranged opposite to each other. A liquid crystal layer 50 is inserted and sealed between the TFT array substrate 10 and the opposing substrate 20 and the TFT array substrate 10 and the opposing substrate 20 are affixed to each other by a sealing material 52 provided in the sealing area positioned around the image display area 10a.

In the outer area of the sealing material 52, a data line drive circuit 101 to drive the data line 6a by supplying image signals to the data line 6a at a predetermined timing, and the external circuit connecting terminals 102 are provided along one side of the TFT array substrate 10, and scanning line drive circuits 104 to drive the scanning line 3a by supplying scan signals to the scanning line 3a at a predetermined timing is provided along two sides adjacent to the one side.

Further, if delay of the scan signals supplied to the scanning line 3a does not matter, the scanning line drive circuit 104 on only one side is sufficient. Furthermore, the data line drive circuit 101 may be arranged on both sides along the sides of the image display area 10a.

The remaining one side of the TFT array substrate 10 is provided with a plurality of wirings 105 for connection between the scanning line drive circuits 104 provided on both sides of the image display area 10a. Further, at least one corner of the opposing substrate 20 is provided with a conductive material 106 for electrical connection between the TFT array substrate 10 and the opposing substrate 20. Furthermore, as shown in FIG. 21, the opposing substrate 20 having almost the same profile as the sealing material 52 shown in FIG. 20 is bonded to the TFT array substrate 10 through the sealing material 52.

In FIG. 21, after the TFTs for switching pixels, or wirings, such as the scanning lines, the data lines are formed on the TFT array substrate 10, and the oriented film is formed on the pixel electrodes 9a. In addition to the opposing electrode 21, the oriented film is formed on the uppermost portion of the opposing substrate 20. Further, the liquid crystal layer 50 is formed of the liquid crystal in which, for example, one kind or several kinds of nematic liquid crystal are mixed, and is oriented in a predetermined state between a pair of oriented films.

Furthermore, on the TFT array substrate 10, in addition to the data line drive circuit 101 and the scanning line drive circuit 104, a sampling circuit to apply image signals to the plurality of data lines 6a at a predetermined timing, a precharge circuit to supply a precharge signal of a predetermined voltage level to the plurality of data lines prior to the image signals, an inspection circuit to inspect the quality or defects of the electro-optical device during production thereof or in shipping thereof and the like may be formed.

Exemplary Embodiment of Electronic Apparatus

Figure 22:
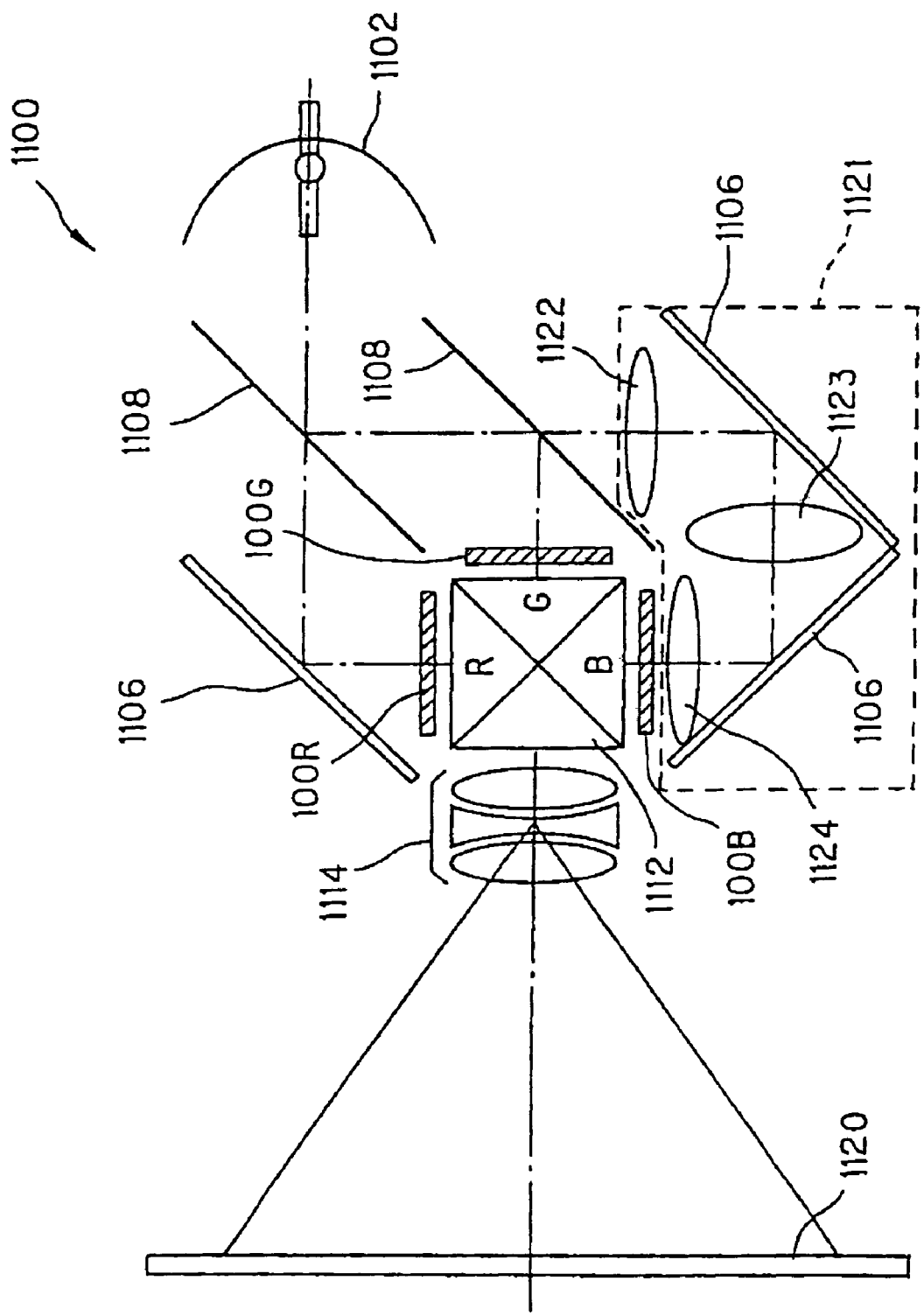
FIG. 22 is a schematic sectional view illustrating a color liquid crystal projector that is an example of a projection type color display apparatus as an exemplary embodiment of an electronic apparatus of the present invention.

Next, for an embodiment of a color display device of a projection type that is an example of an equipment using the above-described electro-optical device as a light bulb, the whole construction thereof, in particular, the optical construction thereof is explained. FIG. 22 is a diagrammatic sectional view of the color display device of a projection type.

In FIG. 22, a liquid crystal projector 1100 that is an example of the color display device of a projection type in the present exemplary embodiment includes three liquid crystal modules including the liquid crystal device in which the drive circuit is mounted on the TFT array substrate, and further includes the respective light bulbs 100R, 100G and 100B for RGB. In the liquid crystal projector 1100, when transmitted light is emitted from a lamp unit of white light source such as a metal halide lamp, the light is divided into the light components R, G and B corresponding to the three primary colors RGB by three mirrors 1106 and two dichroic mirrors 1108 and guided to the light bulbs 100R, 100G and 100B corresponding to the respective colors, respectively. At this time, in particular, in order to prevent or reduce the light loss caused by the long light path, the B light is guided through a relay lens system 1121 composed of an incident lens 1122, a relay lens 1123 and an exit lens 1124. Then, the light components corresponding to the three primary colors modulated, respectively, by the light bulbs 100R, 100G and 100B are synthesized again by a dichroic prism 1112, and then are projected as a color image to a screen 1120 through a projecting lens 1114.

The present invention is not limited to the above-described exemplary embodiments, and instead may be appropriately varied without departing from the gist or the spirit of the invention known throughout the claims and the specification. The electro-optical devices including such variation, for example, an electrophoresis apparatus or an electro-luminescence display device, or the electronic apparatus including these electro-optical devices are also included in the technical range of the present invention.

What is claimed is:

1. An electro-optical device, comprising:
  a thin-film transistor having a channel area that extends in a direction and that intersects a predetermined direction that intersects the direction;
  a pixel electrode formed correspondingly to the thin-film transistor;
  a data line extending in the direction in which the channel area extends, the data line having a broad-width portion that overlaps the channel area in plan view;
  a scanning line extending in the predetermined direction and intersecting the data line and the channel area of the thin-film transistor, the scanning line having a broad-width portion in a portion overlapping the channel area of the thin-film transistor in plan view and a narrow width portion in another portion;
  a storage capacitor including a pixel-potential capacitor electrode, a fixed-potential capacitor electrode, and a dielectric film interposed between the pixel-potential capacitor electrode and the fixed-potential capacitor electrode;
  a capacitive line having a portion that serves as the fixed-potential capacitor electrode of the storage capacitor, the capacitive line having a portion extending along the scanning line and a portion extending along the data line, the portion extending along the data line having a width that is equal to or broader than a width of the data line; and
  a contact hole electrically connecting the data line and the thin film transistor, the contact hole being positioned at a portion of the broad-width portion of the data line that extends beyond the channel area in a direction extending from the channel area toward the contact hole.

2. An electro-optical device, comprising:
  a thin-film transistor having a channel area that extends in a direction and that intersects a predetermined direction that intersects the direction;
  a pixel electrode formed correspondingly to the thin-film transistor;
  a data line extending in the direction in which the channel area extends, the data line having a broad portion that overlaps the thin-film transistor and a non-broad portion that does not overlap the thin-film transistor, the broad portion being wider than the non-broad portion;
  a scanning line extending in the predetermined direction and intersecting the data line and the channel area of the thin-film transistor, the scanning line having a broad-width portion in a portion facing the channel area of the thin-film transistor and a narrow width portion in another portion;
  a storage capacitor including a pixel-potential capacitor electrode, a fixed-potential capacitor electrode, and a dielectric film interposed between the pixel-potential capacitor electrode and the fixed potential capacitor electrode; and
  a capacitive line having a portion that serves as the fixed-potential capacitor electrode of the storage capacitor, the capacitive line having a portion extending along the scanning line and a portion extending along the data line, the portion extending along the data line having a width that is narrower than the broad portion of the data line and that is wider than the non-broad portion of the data line.

3. The electro-optical device according to claim 2, further comprising a contact hole that electrically connects the thin-film transistor and the data line, the data line being continuously broad from the broad portion that overlaps the thin-film transistor a portion where the contact hole is located.

* * * * *